US012810396B2

(12) United States Patent
Armstrong-Crews et al.

(10) Patent No.: US 12,810,396 B2
(45) Date of Patent: Nov. 24, 2026

(54) METHODS AND SYSTEMS FOR MITIGATING THE EFFECTS OF WEATHER-RELATED ATTENUATION ON RADAR IMAGERY

(71) Applicant: Waymo LLC, Mountain View, CA (US)

(72) Inventors: Nicholas Lloyd Armstrong-Crews, San Jose, CA (US); Kenneth T. Ho, Los Angeles, CA (US); Larry Don Smith, Jr., San Jose, CA (US); Michael Dane Fina, Glen Ellyn, IL (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/759,076

(22) Filed: Jun. 28, 2024

(65) Prior Publication Data

US 2026/0004405 A1 Jan. 1, 2026

(51) Int. Cl.
*G06T 5/70* (2024.01)
*B60W 30/14* (2006.01)
(Continued)

(52) U.S. Cl.
CPC ............ *G06T 5/70* (2024.01); *B60W 30/143* (2013.01); *B60W 40/02* (2013.01); *G06T 5/50* (2013.01);
(Continued)

(58) Field of Classification Search
CPC .... G06T 5/70; G06T 5/50; G06T 5/60; G06T 2207/10044; G06T 2207/20084;
(Continued)

(56) References Cited

U.S. PATENT DOCUMENTS

| | | | | |
|---|---|---|---|---|
| 9,568,602 | B1 * | 2/2017 | Stadelmann | G01S 7/03 |
| 11,079,489 | B2 | 8/2021 | Surace | |

(Continued)

FOREIGN PATENT DOCUMENTS

| | | | | |
|---|---|---|---|---|
| CN | 115825962 B | 7/2023 | | |
| CN | 116451423 A * | 7/2023 | | G01S 13/95 |

(Continued)

OTHER PUBLICATIONS

Translation of EP 3128344 A1 retrieved from PE2E Search on Nov. 18, 2025 (Year: 2025).*

(Continued)

*Primary Examiner* — Fadey S. Jabr
*Assistant Examiner* — Faris Asim Shaikh
(74) *Attorney, Agent, or Firm* — McDonnell Boehnen Hulbert & Berghoff LLP

(57) ABSTRACT

The disclosed technology pertains to methods and systems for mitigating the effects of weather on radar imagery. A computing system may receive radar imagery corresponding to an environment of the vehicle and estimate weather conditions for the environment by using a weather estimation model. The computing system may then determine, based on the estimated weather conditions for the environment, weather-related attenuation effects on the radar imagery and correct the radar imagery by removing the weather-related attenuation effects. The corrected radar imagery can be used for object detection and tracking, which can assist a control system of the vehicle. In some cases, the system may determine that the operational range of the radar system is temporarily reduced and responsively decrease the vehicle's speed until weather conditions improve.

17 Claims, 15 Drawing Sheets

(51) Int. Cl.

| | |
|---|---|
| ***B60W 40/02*** | (2006.01) |
| ***G06T 5/50*** | (2006.01) |
| ***G06T 5/60*** | (2024.01) |

(52) U.S. Cl.

CPC ......... *G06T 5/60* (2024.01); *B60W 2420/403* (2013.01); *B60W 2420/408* (2024.01); *B60W 2555/20* (2020.02); *G06T 2207/10044* (2013.01); *G06T 2207/20084* (2013.01); *G06T 2207/30192* (2013.01); *G06T 2207/30252* (2013.01)

(58) Field of Classification Search

CPC ........... G06T 2207/30192; G06T 2207/30252; B60W 30/143; B60W 40/02; B60W 2420/403; B60W 2420/408; B60W 2555/20; G01W 2203/00; G01W 1/00; G01W 1/10; G01S 13/931; G01S 13/937; G01S 2013/93271; G01S 2013/93272; G01S 2013/93274; G01S 2013/93275; G01S 13/89; G01S 7/40; G01S 7/4004; G01S 7/4021; G01S 7/4008; G01S 7/4013; G01S 2013/9322; G01S 13/953; G01S 2013/9325; G08G 5/55; G01C 21/3415; H01Q 1/3233

See application file for complete search history.

(56) References Cited

U.S. PATENT DOCUMENTS

| | | | | |
|---|---|---|---|---|
| 11,143,756 | B2 | 10/2021 | Vacanti | |
| 11,385,346 | B2 | 7/2022 | Song | |
| 11,953,590 | B1 * | 4/2024 | Abdeldayem | G01S 7/354 |
| 12,360,202 | B1 * | 7/2025 | Puglieli | G01S 13/003 |
| 2004/0246167 | A1 * | 12/2004 | Kumon | G01S 13/867 342/107 |
| 2008/0150786 | A1 * | 6/2008 | Breed | B60W 30/04 342/53 |
| 2009/0160700 | A1 * | 6/2009 | Messer-Yaron | G01W 1/10 342/26 R |
| 2013/0271313 | A1 * | 10/2013 | Venkatachalam | G01S 13/951 342/26 R |
| 2017/0315229 | A1 * | 11/2017 | Pavek | G01S 13/931 |
| 2018/0120419 | A1 * | 5/2018 | Bialer | G01S 13/931 |
| 2018/0120429 | A1 * | 5/2018 | Bialer | G01S 7/415 |
| 2019/0126893 | A1 * | 5/2019 | Kim | G01S 7/414 |
| 2020/0363501 | A1 * | 11/2020 | Lau | G01S 15/931 |
| 2021/0406722 | A1 * | 12/2021 | Armstrong-Crews | G06N 3/094 |
| 2022/0065988 | A1 * | 3/2022 | Lee | G01S 13/951 |
| 2022/0244426 | A1 * | 8/2022 | Hallali | G01W 1/10 |
| 2022/0373645 | A1 * | 11/2022 | Travnikar | G01S 13/42 |
| 2023/0131160 | A1 * | 4/2023 | Davalos | G08G 5/53 342/26 B |
| 2023/0142674 | A1 * | 5/2023 | Chebiyyam | G01S 7/412 342/70 |
| 2023/0168359 | A1 * | 6/2023 | Rezvani | G01S 13/003 342/54 |
| 2023/0182742 | A1 | 6/2023 | Han | |
| 2023/0184931 | A1 * | 6/2023 | Wang | G01S 13/89 342/52 |
| 2023/0236317 | A1 * | 7/2023 | Fina | G01S 7/412 342/26 B |
| 2023/0266503 | A1 | 8/2023 | Gail | |
| 2023/0324543 | A1 * | 10/2023 | Kulkarni | G06F 18/23 |
| 2024/0053436 | A1 * | 2/2024 | Kurz | G01S 13/90 |
| 2024/0168150 | A1 * | 5/2024 | Kurono | G01S 7/411 |
| 2024/0248174 | A1 * | 7/2024 | Bialer | G01S 13/42 |
| 2024/0310556 | A1 * | 9/2024 | Ding | G01W 1/18 |
| 2025/0020768 | A1 * | 1/2025 | Giere | G01S 7/354 |
| 2025/0088275 | A1 * | 3/2025 | Wiebold | G01S 17/95 |
| 2025/0206316 | A1 * | 6/2025 | Zhong | B60W 40/02 |
| 2025/0313195 | A1 * | 10/2025 | Yun | B60W 30/09 |
| 2025/0349074 | A1 * | 11/2025 | Naujoks | G06T 13/60 |

FOREIGN PATENT DOCUMENTS

| | | | | |
|---|---|---|---|---|
| CN | 117238143 | A | 12/2023 | |
| CN | 117826635 | A | 4/2024 | |
| EP | 3128344 | A1 * | 2/2017 | G01S 13/951 |
| JP | 2007003210 | A | 1/2007 | |
| JP | 2020118619 | A | 8/2020 | |
| KR | 101645103 | B1 * | 8/2016 | G01S 13/66 |
| KR | 20220111578 | A | 8/2022 | |
| KR | 20230108542 | A | 7/2023 | |
| WO | 2023093825 | A1 | 6/2023 | |

OTHER PUBLICATIONS

Translation of CN116451423A retrieved from Espacenet on Nov. 18, 2025 (Year: 2025).*

Translation of KR-101645103-B1 retrieved from Espacenet on Mar. 19, 2026 (Year: 2026).*

Howard et al., "Environment—Adaptiveradar Techniques", https://apps.dtic.mil/sti/tr/pdf/ADA097262.pdf (1981).

Prokopenko et al., "Adaptive algorithms for weather radar", Firt European Radar Conference, EURAD (2004).

* cited by examiner

METHODS AND SYSTEMS FOR MITIGATING THE EFFECTS OF WEATHER-RELATED ATTENUATION ON RADAR IMAGERY

BACKGROUND

Advancements in computing, sensors, and other technologies have enabled some vehicles to navigate safely between locations autonomously, i.e., without requiring input from a human driver. By processing sensor measurements of the surrounding environment in real-time, a semi-autonomous or autonomous vehicle can transport passengers or objects (e.g., cargo) between locations while avoiding obstacles, obeying traffic requirements, anticipating movements of nearby agents (e.g., other vehicles), and performing other actions that are typically conducted by a driver. Shifting both decision-making and control of the vehicle over to vehicle systems can allow the vehicle's passengers to devote their attention to tasks other than driving.

Automotive radar is one type of sensor technology used for the detection and monitoring of the surrounding environment by advanced driver-assistance systems (ADAS) and autonomous driving systems. In some cases, radar is used to detect and identify other vehicles, pedestrians, and various obstacles, as well as ascertain their distance, velocity, and trajectory.

A radar typically comprises a radiating element equipped with an antenna that transmits radio waves. These waves reflect off objects within the environment and are subsequently captured by the antenna. The returned signals are then processed to evaluate the attributes of the reflecting objects, including Radar Cross Section (RCS) measurements that indicate how detectable each object is by radar. A larger RCS indicates that an object is more easily detected, while a smaller RCS suggests that the object is more difficult to detect. The RCS for an object depends on multiple factors, including the size, shape, material, and surface characteristics of the object, as well as the frequency and polarization of the radar signal. Different types of objects, such as cars, motorcycles, pedestrians, and others, typically have diverse RCS values, which can be used to help identify the types of objects in the radar imagery.

SUMMARY

Example embodiments relate to methods and systems for mitigating the effects of weather-related attenuation on radar imagery and other types of sensor data for improved object detection and tracking. Disclosed solutions can reduce the impact of weather-related attenuation on radar and other types of sensor data, enabling vehicle systems to continue the use of radar and other sensors in adverse weather conditions, such as rain, fog, or snow. In some cases, vehicle systems may perform disclosed solutions to determine the potential loss in sensor data caused by the conditions of the surrounding environment, which can then be used in a manner that enhances the performance of the driver assist or autonomous systems of the vehicle during travel in dynamic weather conditions. For instance, vehicle systems may perform disclosed techniques to identify when environmental conditions impact the operational ranges of radar and/or other sensors, enabling the systems to adjust how sensor data from these sensors are used until weather conditions improve. In some cases, a vehicle may adjust its speed when the max sensing range of radar or another sensor is limited by environment conditions in order to prevent overdriving the vehicle's visibility of the environment.

In one aspect, an example method is described. The method involves receiving, at a computing system coupled to a vehicle, radar imagery corresponding to an environment of the vehicle and estimating, by the computing system using a weather estimation model, weather conditions for the environment. The method also involves determining, based on the estimated weather conditions for the environment, weather-related attenuation effects on the radar imagery and removing the weather-related attenuation effects to correct the radar imagery. The method also involves providing the corrected radar imagery to a control system of the vehicle.

In another aspect, an example system is described. The system includes a vehicle radar system and a computing device coupled to a vehicle. The computing device is configured to receive radar imagery corresponding to an environment of the vehicle and estimate, using a weather estimation model, weather conditions for the environment. The computing device is also configured to determine, based on the estimated weather conditions for the environment, weather-related attenuation effects on the radar imagery and remove the weather-related attenuation effects to correct the radar imagery. The computing device is also configured to provide the corrected radar imagery to a control system of the vehicle.

In yet another aspect, a non-transitory computer-readable medium is described. The non-transitory computer-readable medium is configured to store instructions, that when executed by a computing system comprising one or more processors, causes the computing system to perform operations. The operations involve receiving radar imagery corresponding to an environment of the vehicle and estimating, by the computing system using a weather estimation model, weather conditions for the environment. The operations also involve determining, based on the estimated weather conditions for the environment, weather-related attenuation effects on the radar imagery and removing the weather-related attenuation effects to correct the radar imagery. The operations further involve providing the corrected radar imagery to a control system of the vehicle.

These as well as other aspects, advantages, and alternatives will become apparent to those of ordinary skill in the art by reading the following detailed description, with reference, where appropriate, to the accompanying drawings.

DETAILED DESCRIPTION

Figure 1:
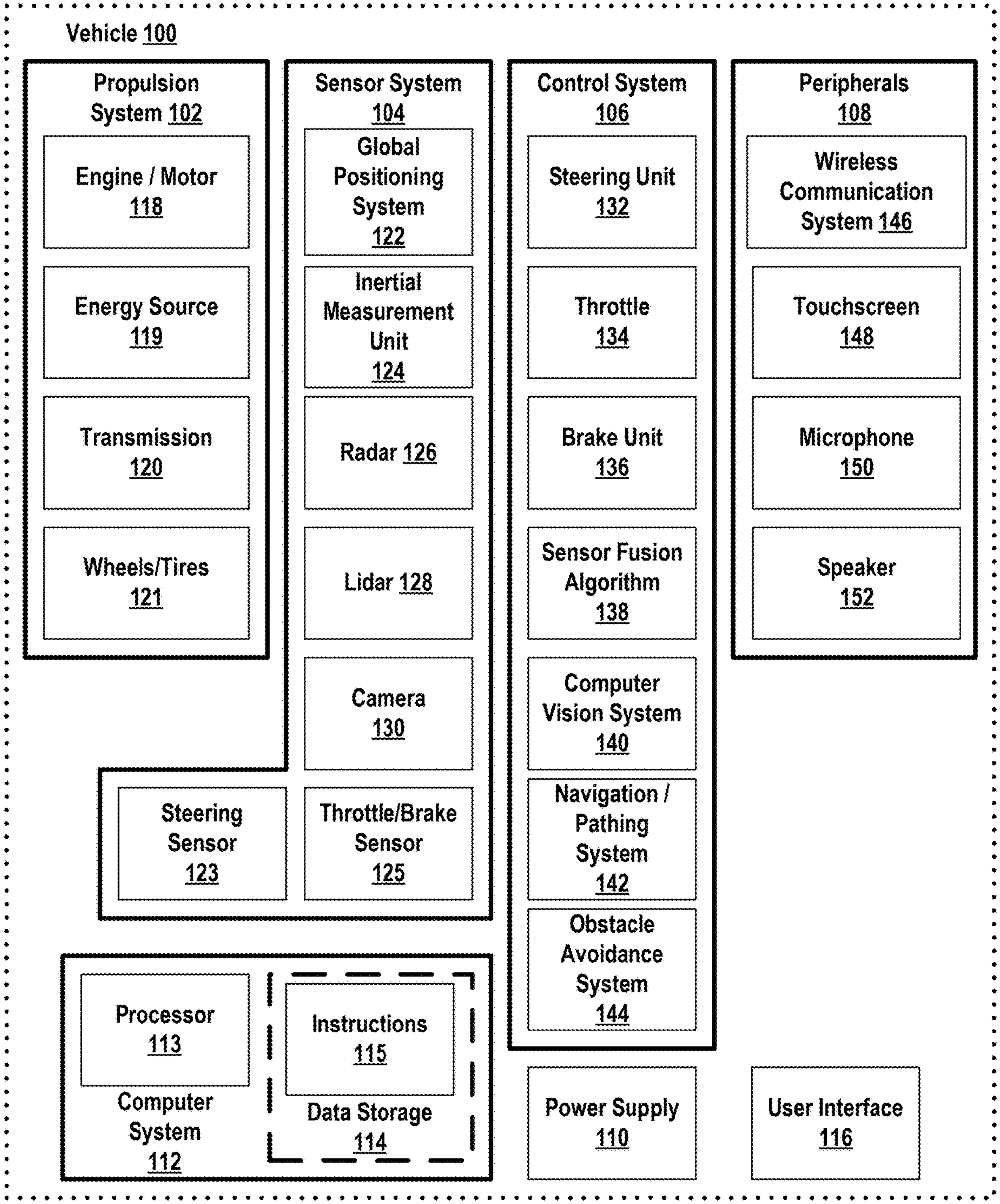
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Automotive radar systems may experience rain, snow, fog, and other inclement weather conditions that can affect the propagation of radar signals, weakening the signals overall. When enough attenuation occurs, the overall quality of the radar data is reduced, thereby potentially decreasing the radar system's ability to accurately detect and track objects in the surrounding environment. In some cases, the attenuation caused by the vehicle's environment can reduce the max sensing capabilities of radar (and potentially other sensors) used by the vehicle. This suboptimal performance by the vehicle radar system (and potentially other sensor systems) may lead to overconfident driving behavior by the vehicle in adverse weather conditions. In particular, vehicle systems may fail to perform corrective actions like reducing the vehicle's speed in cases where the systems fail to determine that environment conditions have temporarily reduced the max sensing range of the vehicle radar system and/or other sensor systems.

Weather conditions can cause attenuation in radar signals and other sensor signals in different ways. Falling raindrops, snowflakes, and other types of precipitation can scatter radar signals and reduce the amount of energy that is reflected back to the radar system. The particular level of attenuation can depend on the intensity, size, and the falling rate of the precipitation. For instance, heavy rain with a higher rain rate and/or larger rain droplets can cause greater attenuation that results in weaker return signals being received by the radar system than lighter rain. Likewise, wet, heavy snow can similarly produce more severe attenuation effects on radar signals compared to the effects produced by dry, powdery snow. In addition, water droplets or ice particles located on the transmission aperture and/or radome of a sensor can also negatively impact sensor performance by absorbing and/or scattering signals, further reducing the signal strength in transmitted and received signals. In some cases, atmospheric gasses like oxygen and water vapor may also contribute to signal strength loss by absorbing electromagnetic wave energy at specific frequencies. Windy conditions experienced during vehicle navigation can also increase attenuation effects by causing the movement of precipitation or other particulates in the air to an extent that influences the scattering and absorption characteristics of the air.

By affecting the propagation and reception of sensor signals, some environment conditions can degrade the performance of vehicle sensors, including limiting a sensor's current max sensing range and other operational parameters. Degraded radar imagery and other sensor data may appear dimmer than similar sensor data generated during fair weather conditions due to the signal loss caused by the environment conditions. The loss associated with the radar imagery or other type of sensor data can decrease the accuracy of the algorithms that are used to detect and track objects in the radar imagery or sensor data. As such, vehicle systems may not be able to rely on radar imagery or sensor data without factoring the decreased intensity caused by the weather conditions. These issues can be amplified in heavy precipitation conditions that cause radar imagery and/or other sensor data to experience greater attenuation leading to a greater loss.

The present disclosure relates to methods and systems for detecting and mitigating the effects of weather-related attenuation on vehicle sensor data, including radar imagery. In some aspects, the disclosed methods and systems may address the issue of radar beam attenuation that might arise due to inclement weather and help prevent overconfident or undesired autonomous vehicle driving behavior during poor weather conditions. Vehicle systems may perform disclosed techniques to determine when environment conditions have decreased the max range and/or other operational parameters of the vehicle radar system and other vehicle sensor systems. The vehicle systems may then temporarily adjust the vehicle's speed or other control parameters (e.g., braking distance) to prevent the vehicle from overdriving its visibility. Once the vehicle systems determine that the operational ranges of the radar system and/or other sensor systems have improved due to changes in environment conditions, the vehicle systems can then further adjust the vehicle control strategy.

The disclosed solutions generally involve inferring and factoring the effects of weather-related attenuation on radar imagery and/or other sensor data to enable real-time adjustments of the vehicle operations and control strategy to accommodate when the environment impairs sensor performance. For instance, a vehicle computing system may use disclosed techniques to restore the radar imagery to how the radar imagery would appear in fair weather conditions. A radar imagery correction process may involve a real-time estimation of radar sensitivity degradation, which can then be used by vehicle systems to perform one or multiple corrective actions that can enhance the safety and reliability of general autonomous vehicle operations. In some cases, the disclosed solutions are used by vehicle systems to infer and factor the effects of weather conditions on radar data and other types of sensor data, such as camera images or point cloud data from lidar.

An example method for mitigating the effects of weather-attenuation on radar imagery may initially involve using a weather estimation model as an intermediary to estimate the current weather conditions experienced in the vehicle's environment. For instance, a vehicle system or another computing system may use a weather estimation model configured with a rain rate estimator to infer the rain rate in the vehicle's environment. The rain rate estimator may analyze newly obtained radar imagery to output a rain rate measured in millimeters per hour (mm/hr) or another unit of measurement, which can then be mapped to aperture and atmospheric losses in return signal strength for one or more radars operating on the vehicle. These losses in return signal strength may be represented in units of decibels (dB) and can enable vehicle systems to apply corrective actions to maintain safe navigation despite adverse environment conditions.

To infer the losses caused by the environment conditions, a computing system may use a weather loss model. The weather loss model may be trained to map the rain rate to loss in the sensor data caused by environment conditions. The loss can represent decreases in RCS values caused by precipitation (e.g., rain) and other environmental conditions. The computing system may use the estimated loss to determine whether corrective actions should be performed. In some cases, the loss may not be substantial enough to trigger the vehicle to perform one or multiple corrective actions. For instance, the computing system may utilize a loss threshold or multiple loss thresholds to determine when to perform certain corrective actions. In some examples, each corrective action can be associated with a different loss threshold.

Corrective actions represent different strategies that vehicle systems may employ to mitigate the effects caused by weather and/or other environment conditions. In some cases, the control system may adjust the vehicle control strategy based on the estimated loss associated with one or multiple sensors. For instance, when the maximum sensing range for the radar system is temporarily reduced due to environmental conditions, the control system may decrease the vehicle's speed to avoid the vehicle driving beyond its reduced visibility. As such, vehicle systems may perform disclosed techniques to determine when the operational range of one or multiple sensors have been reduced due to environmental conditions.

In some cases, a corrective action may be applied to the radar imagery, such as the application of an offset. For instance, the corrective action may involve offsetting the decrease in return signal strength caused by the weather conditions. The size of the offset depends on the size of the estimated loss. For example, if a computing system determines radar imagery has an approximate loss of negative 20 decibel (dB), the computing system may apply a positive 20 dB offset. The weather loss model can be trained to output an appropriate offset or offsets to be applied to convey how radar imagery or other forms of sensor data would appear in clear weather conditions.

In some examples, a computing system may use multiple models with the weather estimation model and the weather loss model existing as separate models. In other examples, the weather estimation model and the weather loss model may be part of the same model. In addition, models can be updated in real-time onboard the vehicle and/or periodically by a remote computing system. For instance, updated models may be received by vehicle systems via an over-the-air update generated by a remote computing system.

A computing system may employ various techniques and information sources to estimate weather and other conditions in the vehicle's environment. For instance, vehicle sensors, information provided by external sources (e.g., other vehicles or computing systems), and weather forecasts can be used by vehicle systems to detect precipitation and other environmental conditions that may influence sensor performance. Some example vehicle sensors that can be used to detect external conditions include lidar, cameras, radar, temperature sensors, humidity sensors, and/or wind sensors, among others. For instance, a weather estimation model can be trained to map raw backscatter values in radar imagery to an estimated rain rate. The estimated rain rate can indicate the rate at which rain is falling in the vehicle's environment. The weather estimation model can similarly be trained to estimate the rate at which other forms of precipitation (snow, hail, sleet) are falling. The computing system may then use a weather loss model trained to map the estimated rain rate (or estimated rate at which other types of precipitation are falling) to losses associated with radar imagery or other types of sensor data obtained by vehicle sensors during navigation in these environmental conditions. The weather loss model can be used to determine the estimated reduction in observed RCS values in the radar imagery. During vehicle navigation, the computing system may use the weather loss model to analyze estimated weather conditions to determine the potential negative effects that the weather conditions have on radar imagery and/or other types of sensor data.

Another example method may bypass estimating the current weather conditions in the vehicle's environment and proceed with directly comparing observed sensor radar to a baseline model or set of baseline models. The results of the comparison may enable the computing system to estimate the loss associated with radar imagery or other types of sensor data. The method may be performed periodically or continuously by vehicle systems to understand how dynamic environments experienced during travel influence sensor performance. For instance, a computing system may periodically or continuously compare incoming radar data to one or multiple baseline models to evaluate the max sensing range and other operational parameters of the radar system. In some cases, when a loss difference between incoming radar data and the baseline model exceeds a loss threshold, the computing system may trigger performance of one or multiple corrective actions, such as adjusting the vehicle's current control strategy and/or applying an offset to the radar data to correct the radar data.

The computing system may use one or multiple baseline models to detect when environment conditions degrade radar imagery or other types of sensor data. A baseline model may represent how the sensor data would likely appear if the vehicle was operating in clear weather conditions. In some cases, the baseline model may represent expected values if the sensor data was generated in clear weather conditions. For instance, a baseline model used to analyze radar imagery may convey expected RCS values for objects in the environment. A baseline model may use various benchmarks to represent useful information for evaluating the impact of environment conditions on sensor performance. The format and information conveyed by a baseline model can depend on the type of sensor being analyzed. For instance, a baseline model for radar can take the form of a radar map, information conveying expected RCS values for different object types, or an expected clutter versus noise profile.

By comparing observed incoming data to baseline expectations, vehicle systems may detect and estimate the likely loss caused by environment conditions on radar imagery and perform one or more corrective actions in response. In some cases, corrective actions may include adjusting the vehicle's speed to accommodate reductions in the sensing ranges or field of views of the radar system or other type of sensor system, modifying use or reliance on certain vehicle sensors, or pulling the vehicle over until environment conditions change. Other corrective actions may be performed by vehicle systems.

Disclosed methods can be performed using radar data in various forms. For instance, a computing system may perform techniques described herein with radar data in a voxel format. In other instances, the observed radar data may be represented as Range-Doppler maps (RDMs). RDMs may provide a two-dimensional representation of the radar data, with one dimension representing the range (or distance) to the target and the other dimension representing the Doppler shift (or relative velocity) of the target. In other cases, the observed radar data may be represented as range-angle images. Range-angle images may provide a two-dimensional representation of the radar data, with one dimension representing the range to the target and the other dimension representing the angle of arrival of the radar signal. In addition, the computing system performing disclosed methods can differ within examples and may include any combination of computing devices located onboard or remote from a vehicle. In some cases, field programmable gate arrays (FPGA) and/or application-specific integrated circuits positioned at radars may perform one or more features of the disclosed methods.

In some aspects, the correction of the radar imagery may involve removing the weather-related attenuation effects based on the comparison to one or multiple baseline models. This process may involve identifying the differences between the observed radar data and the expected values expressed by one or more baselines. These differences may represent the effects of weather-related attenuation on the radar imagery and may be removed from the observed radar data to correct the radar imagery. The corrected radar imagery may thus represent how the radar imagery would look under fair weather conditions, providing a more accurate representation of the environment.

In some cases, the computing system may use a baseline model that includes a radar map that represents how radar imagery appears in different locations during fair weather conditions. Fair weather conditions may represent situations when the environment lacks precipitation or other elements (e.g., high winds or humidity) that may cause the attenuation of radar signals decreasing the accuracy of radar imagery generated by the radar system. In some examples, the computing system may create or update the radar map based on radar imagery captured during fair weather conditions. The computing system may use other sensor data to validate that the current weather conditions are fair when collecting radar imagery to create or update the radar map. In other examples, the computing system may receive the model with the radar map via an over-the-air update received from a remote computing system. For instance, the remote computing system may generate the radar map based on radar data generated during known testing conditions and/or obtained from multiple vehicles navigating during fair weather conditions and distribute the radar map to a fleet of vehicles as part of an update.

In some examples, the computing system may compare RCS values represented in current radar imagery to RCS values previously determined for different object types during fair weather conditions. For instance, the computing system may use a baseline model that indicates these predefined RCS values for a variety of objects frequently encountered during vehicle navigation, such as other vehicles, buildings, signs, lane markers, traffic signals, pedestrians, and bicyclists, among others. When the RCS values for objects in an environment derived from current radar data differs from the expected RCS values for the same object types specified in the model, the computing system may perform corrective actions to calibrate the current radar data. In particular, the computing system may apply an offset to the RCS values derived from current radar imagery as a way to factor the impact of current weather conditions on the performance of the radar system.

In some examples, the computing system may determine the effects on radar imagery or other types of sensor data by using an expected clutter vs. noise profile for weather estimation, which can provide a baseline reference for the expected level of clutter and noise in the radar imagery in fair weather conditions. One or multiple types of baseline references may be used to compare with the observed radar data and determine the level of weather-related attenuation effects on the radar imagery. For instance, one or multiple models can be used with each model representing one or multiple baseline references that can be used to evaluate the quality of radar imagery.

In some cases, the computing system may instruct downstream vehicle systems to rely less or refrain from using information determined based on radar data until the computing system determines that the environment's weather conditions have improved. The vehicle control system may also adjust its control strategy for the vehicle when the radar data is impaired by weather conditions. For instance, the vehicle control system may increase following distances, apply brakes sooner, and/or adjust speed and steering strategies, among other potential changes.

In some examples, the selection of the baseline model used to analyze the quality of radar data received from one or multiple vehicle radars can depend on criteria, such as the weather conditions estimated for the vehicle's environment, the location of the vehicle, and/or the availability of baseline models. The baseline models may also be customized for each vehicle or may be common models used by multiple vehicles, which may operate as part of a fleet of vehicles. For example, the radar map used for weather compensation may vary depending on the specific implementation. In some cases, a common radar map may be used for all vehicles within a fleet. For instance, the common radar map may be a standardized map that is used across a fleet of vehicles, which may depend on vehicle type, location, and/or radar system parameters. Vehicles that use radar systems that operate within a particular frequency band may use one common radar map while vehicles that use radar systems that operate in other frequency bands may use other common radar maps.

In other cases, each vehicle may develop its own radar map. This individual radar map may be specific to the vehicle and may be developed based on the vehicle's own radar data and experiences. The accuracy of the radar map can impact the accuracy of weather compensation. In some cases, a vehicle may customize a common map based on its own radar data and specific experiences. Vehicles can also contribute radar data and other information to a central system, which may update and distribute the updated common maps back to the fleet of vehicles. This feedback loop enables the vehicles to enhance the radar map or other type of baseline models used to detect the impact of inclement weather on radar data and other types of sensor.

In addition to the methods, the present disclosure also describes systems that can mitigate the negative effects of weather conditions on radar data and other types of sensor data. By mitigating the impact of weather on sensor data, vehicles may be able to rely on the sensor data to safely navigate during various weather conditions. The system may include a vehicle radar system and a computing device coupled to a vehicle. The computing device may be configured to receive radar imagery corresponding to an environment of the vehicle, estimate weather conditions for the environment using a weather estimation model, determine weather-related attenuation effects on the radar imagery based on the estimated weather conditions, remove the weather-related attenuation effects to correct the radar imagery, and provide the corrected radar imagery to a control system of the vehicle. This system may enhance the safety and reliability of autonomous vehicle operations by providing more accurate radar data, regardless of weather conditions. The system may also be used to enhance a driver's understanding of the surrounding environment by providing information (e.g., an audiovisual representation) about the environment derived from corrected radar data.

In some aspects, the methods and systems may provide real-time estimation of radar sensitivity degradation. This real-time estimation may allow for immediate adjustments to be made to the radar system or the driving behavior of the autonomous vehicle, potentially enhancing the safety and reliability of autonomous vehicle operations. For example, if the radar sensitivity is determined to be severely degraded due to heavy rain, the autonomous vehicle may be instructed to slow down or take other precautionary measures.

In some cases, the methods and systems may involve comparing current radar data products or summary metrics at a specific location against historical data varying from undegraded to heavily degraded. This comparison may allow for the level of degradation to be inferred, which can then be used to correct the radar imagery. The corrected radar imagery may then be provided to a control system of the vehicle, which may use this imagery to control the operations of the vehicle.

The disclosed methods and systems can provide several technical benefits that may enhance vehicle navigation. Mitigating the effects of weather-related attenuation on radar imagery can enhance the performance of object detection and tracking systems used by vehicles under various weather conditions. The disclosed methods and systems enable enhanced perception in adverse weather conditions. By reducing the impact of weather-related attenuation, radar systems can maintain high-quality perception capabilities even in adverse weather conditions such as rain, fog, or snow. More accurate radar data may allow for better-making by a vehicle's control system and lead to safer driving behavior overall. For instance, vehicle systems may use radar data to reliably detect obstacles, pedestrians, or other vehicles, and take appropriate action to avoid collisions.

In some cases, real-time estimation of radar sensitivity degradation can allow for immediate adjustments to the radar system or the driving behavior of the vehicle. This dynamic response can be useful to enhance vehicle performance and safety in rapidly changing weather conditions. Corrected radar imagery can also improve the detection and classification of objects in the surrounding environment. This can lead to more accurate predictions about the behavior of other road users and better strategic planning for an autonomous navigation system. The disclosed methods and systems may also enable radar systems to provide increased operational range and better object detection and classification. The ability to compensate for weather effects can potentially increase the operational range of ADAS and autonomous systems, allowing them to function effectively in a wider range of weather conditions. In some examples, a vehicle may use corrected radar imagery to display a representation of detected objectives relative to the vehicle, which can enhance the awareness of the driver. In addition, a system for mitigating weather-related attenuation can also be tailored to specific geographic locations by factoring local weather patterns and conditions, which can further improve the accuracy of weather compensation and radar data interpretation.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve and a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in the navigation of vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speedbumps, or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150 (e.g., one or more interior and/or exterior microphones), and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include processor 113 (which could include at least one microprocessor) operable to execute instructions 115 stored in a non-transitory, computer-readable medium, such as data storage 114. As such, processor 113 can represent one or multiple processors. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

Vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones and sonar devices), or one or more other sensors configured to sense information about an environment that is surrounding vehicle 200. In other words, any sensor system now known or later created could be coupled to vehicle 200 and/or could be utilized in conjunction with various operations of vehicle 200. As an example, a lidar could be utilized in self-driving or other types of navigation, planning, perception, and/or mapping operations of vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed of in various other locations on the vehicle (e.g., at location 216) and could have fields of view that correspond to internal and/or surrounding environments of vehicle 200.

The sensor system 202 may be mounted atop vehicle 200 and may include one or more sensors configured to detect information about an environment that is surrounding vehicle 200, and output indications of the information. For example, sensor system 202 can include any combination of cameras, radars, lidars, inertial sensors, humidity sensors, and acoustic sensors (e.g., microphones and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around vehicle 200. In another embodiment, the movable mount of the sensor system 202 could be movable in a scanning fashion within a particular range of angles and/or azimuths and/or elevations. The sensor system

202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of sensor systems 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar devices. For example, the lidar devices could include a plurality of light-emitter devices arranged over a range of angles with respect to a given plane (e.g., the x-y plane). For example, one or more of sensor systems 202, 204, 206, 208, 210, 212, 214, and/or 218 may be configured to rotate or pivot about an axis (e.g., the z-axis) perpendicular to the given plane so as to illuminate an environment that is surrounding vehicle 200 with light pulses. Based on detecting various aspects of reflected light pulses (e.g., the elapsed time of flight, polarization, and intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of vehicle 200. For example, one or more sensor systems 202, 204, 206, 208, 210, 212, 214, and/or 218 could include one or more radars. In some examples, one or more radars can be located near the rear of vehicle 200 (e.g., sensor systems 208 and 210), to actively scan the environment near the back of vehicle 200 for the presence of radio-reflective objects. Similarly, one or more radars can be located near the front of vehicle 200 (e.g., sensor systems 212 or 214) to actively scan the environment near the front of vehicle 200. A radar can be situated, for example, in a location suitable to illuminate a region including a forward-moving path of vehicle 200 without occlusion by other features of vehicle 200. For example, a radar can be embedded in and/or mounted in or near the front bumper, front headlights, cowl, and/or hood, etc. Furthermore, one or more additional radars can be located to actively scan the side and/or rear of vehicle 200 for the presence of radio-reflective objects, such as by including such devices in or near the rear bumper, side panels, rocker panels, and/or undercarriage, etc.

Vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, vehicle 200 can determine the distance to the points on the object. The predetermined light pattern may comprise infrared light, or radiation at other suitable wavelengths for such measurements. In some examples, the camera can be mounted inside the front windshield of vehicle 200. Specifically, the camera can be situated to capture images from a forward-looking view with respect to the orientation of vehicle 200. Other mounting locations and viewing angles of the camera can also be used, either inside or outside vehicle 200. Further, the camera can have associated optics operable to provide an adjustable field of view. Still further, the camera can be mounted to vehicle 200 with a movable mount to vary a pointing angle of the camera, such as via a pan/tilt mechanism.

Vehicle 200 may also include one or more acoustic sensors (e.g., one or more of sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment that is surrounding vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), vehicle 200 may slow down and/or navigate to the edge of a roadway.

Although not shown in FIGS. 2A-2E, vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

Vehicle 200 may include one or more other components in addition to or instead of those shown. The additional components may include electrical or mechanical functionality.

A control system of vehicle 200 may be configured to control vehicle 200 in accordance with a control strategy from among multiple possible control strategies. The control system may be configured to receive information from sensors coupled to vehicle 200 (on or off vehicle 200), modify the control strategy (and an associated driving behavior) based on the information, and control vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
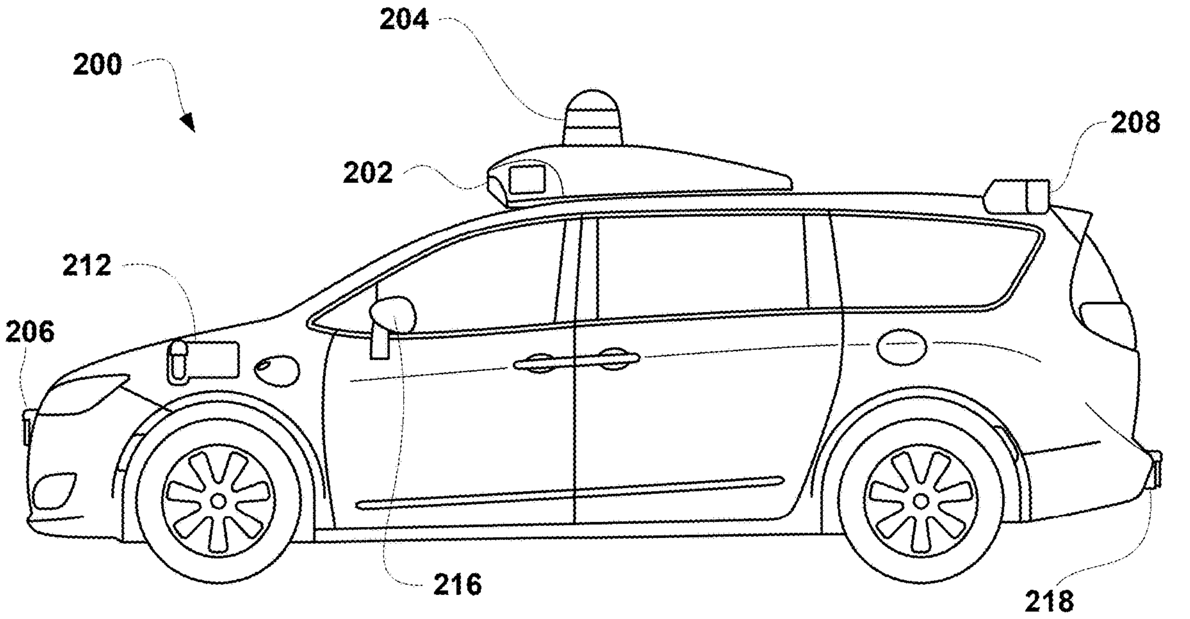
FIG. 2A is an illustration of a physical configuration of a vehicle, according to example embodiments.
Figure 2B:
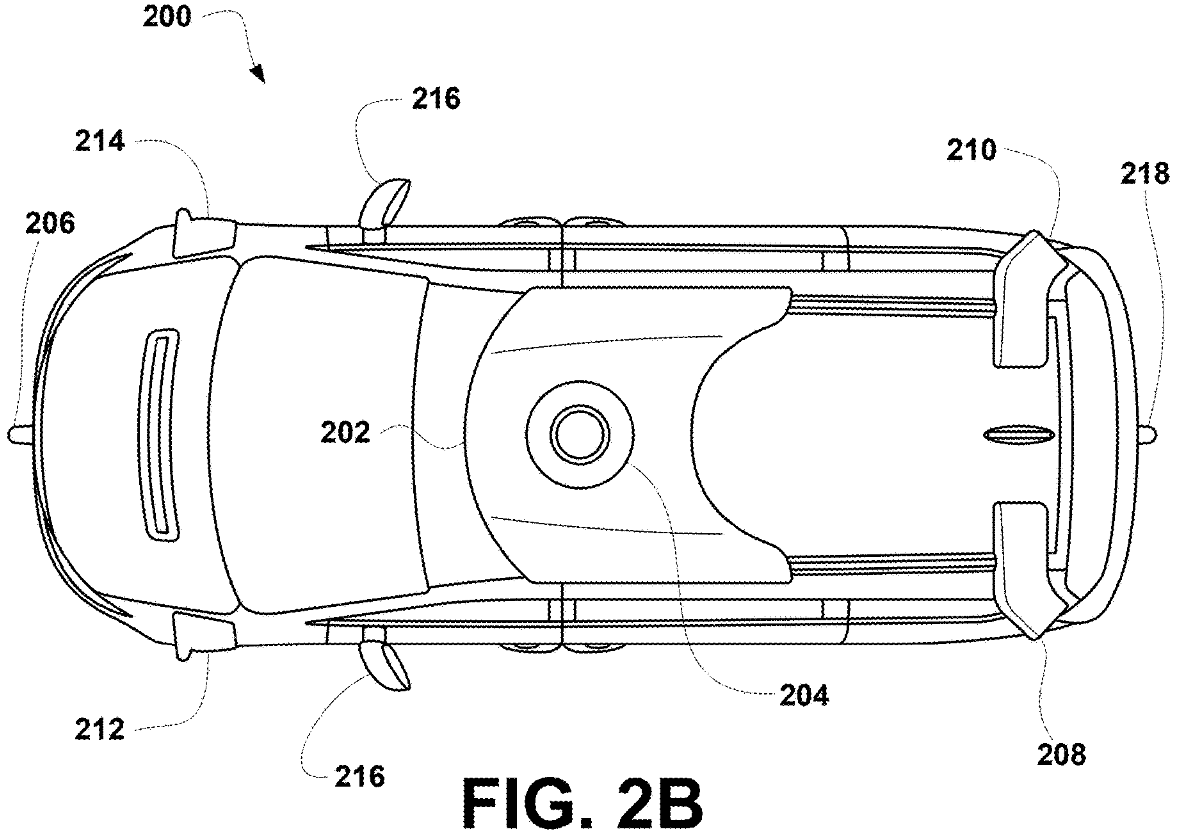
FIG. 2B is an illustration of a physical configuration of a vehicle, according to example embodiments.
Figure 2C:
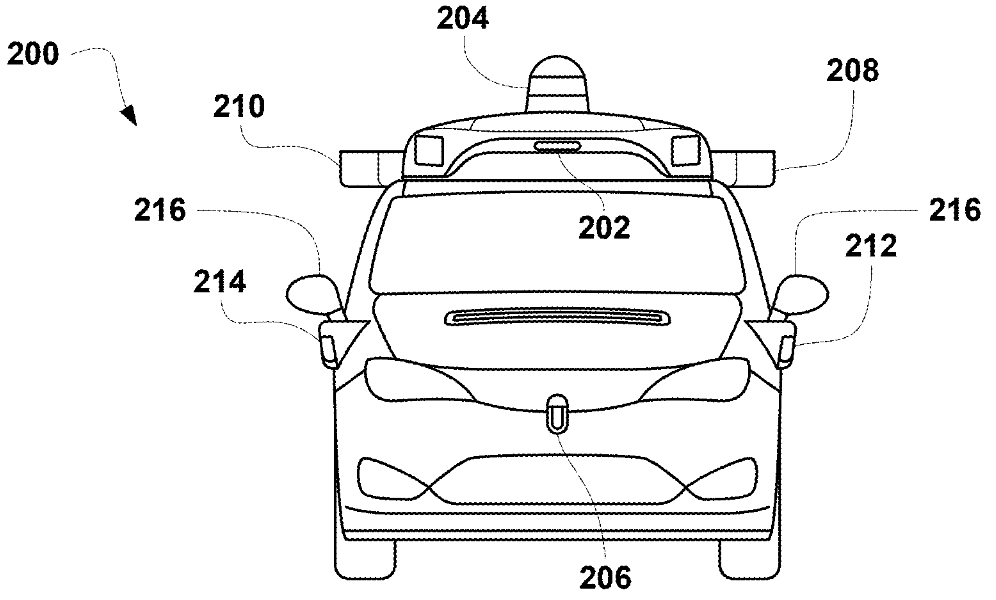
FIG. 2C is an illustration of a physical configuration of a vehicle, according to example embodiments.
Figure 2D:
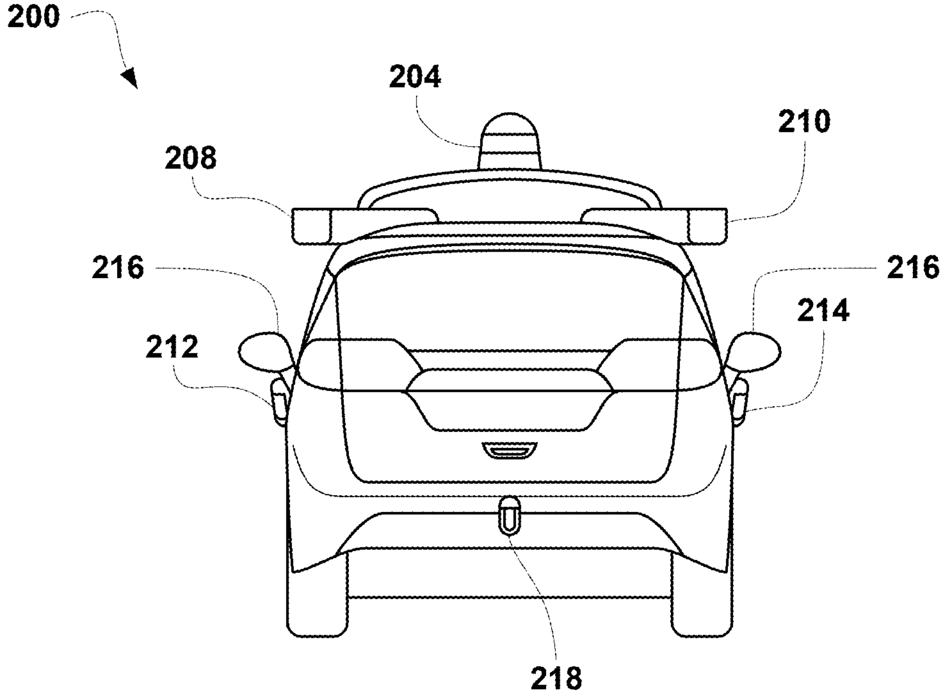
FIG. 2D is an illustration of a physical configuration of a vehicle, according to example embodiments.
Figure 2E:
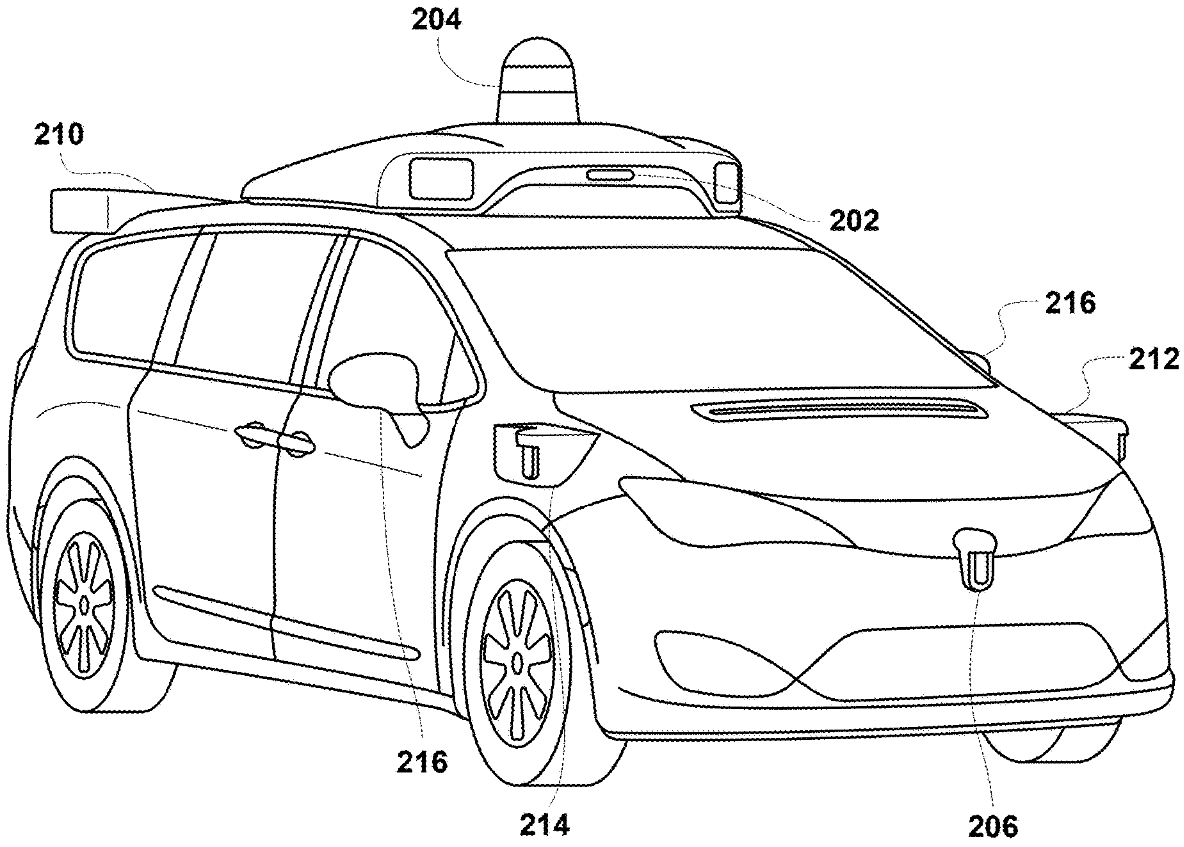
FIG. 2E is an illustration of a physical configuration of a vehicle, according to example embodiments.
Figure 2F:
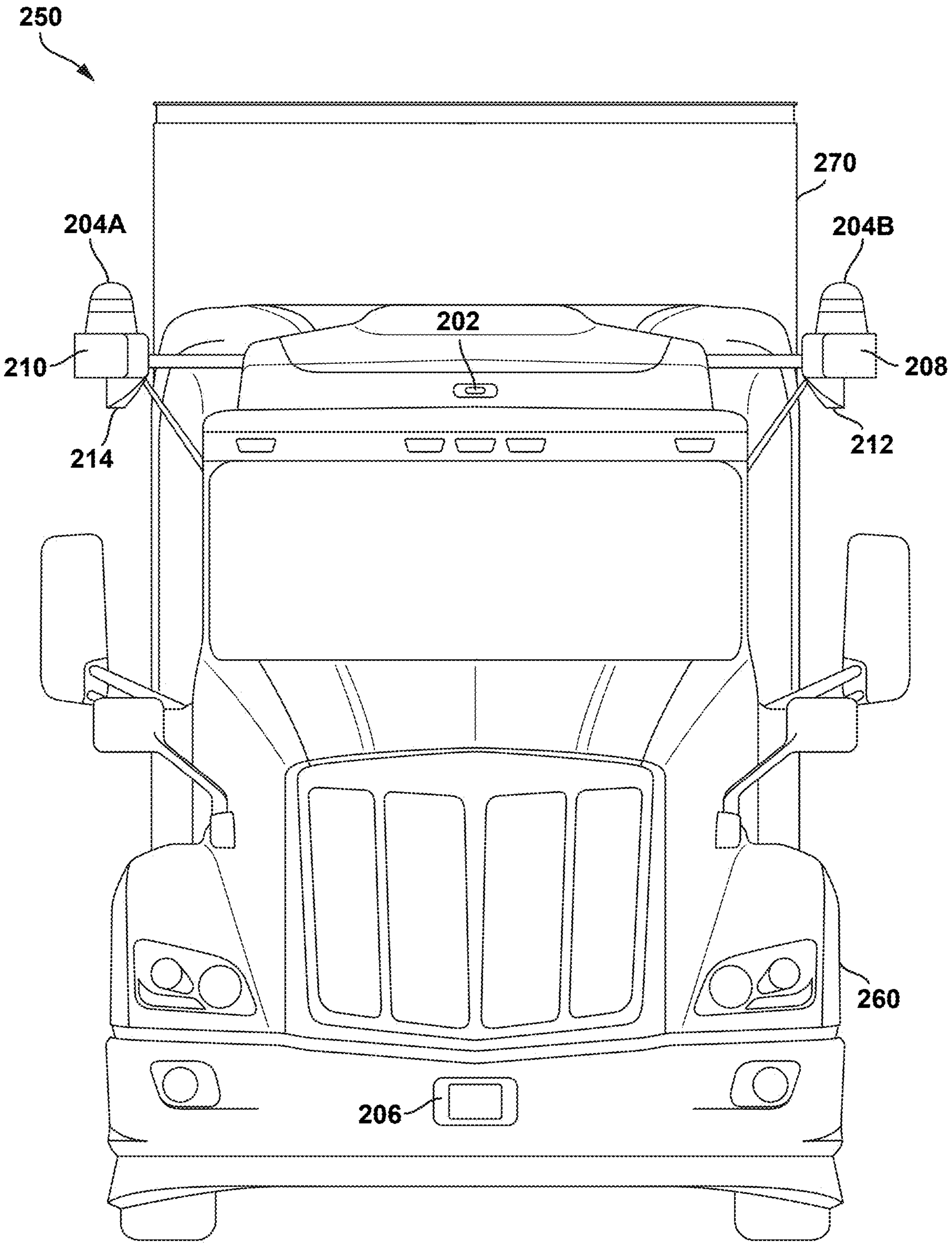
FIG. 2F is an illustration of a physical configuration of a vehicle, according to example embodiments.
Figure 2G:
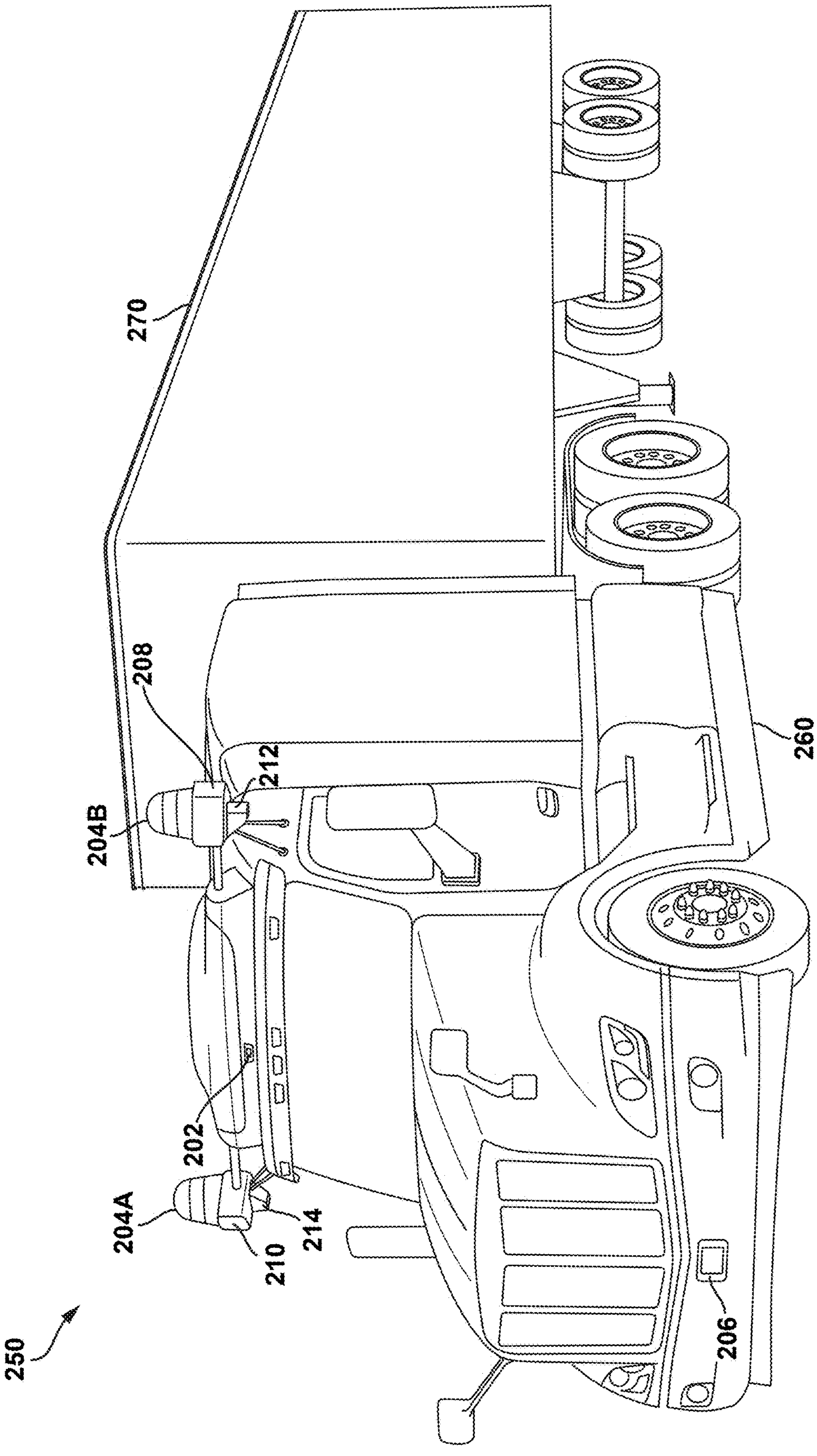
FIG. 2G is an illustration of a physical configuration of a vehicle, according to example embodiments.
Figure 2H:
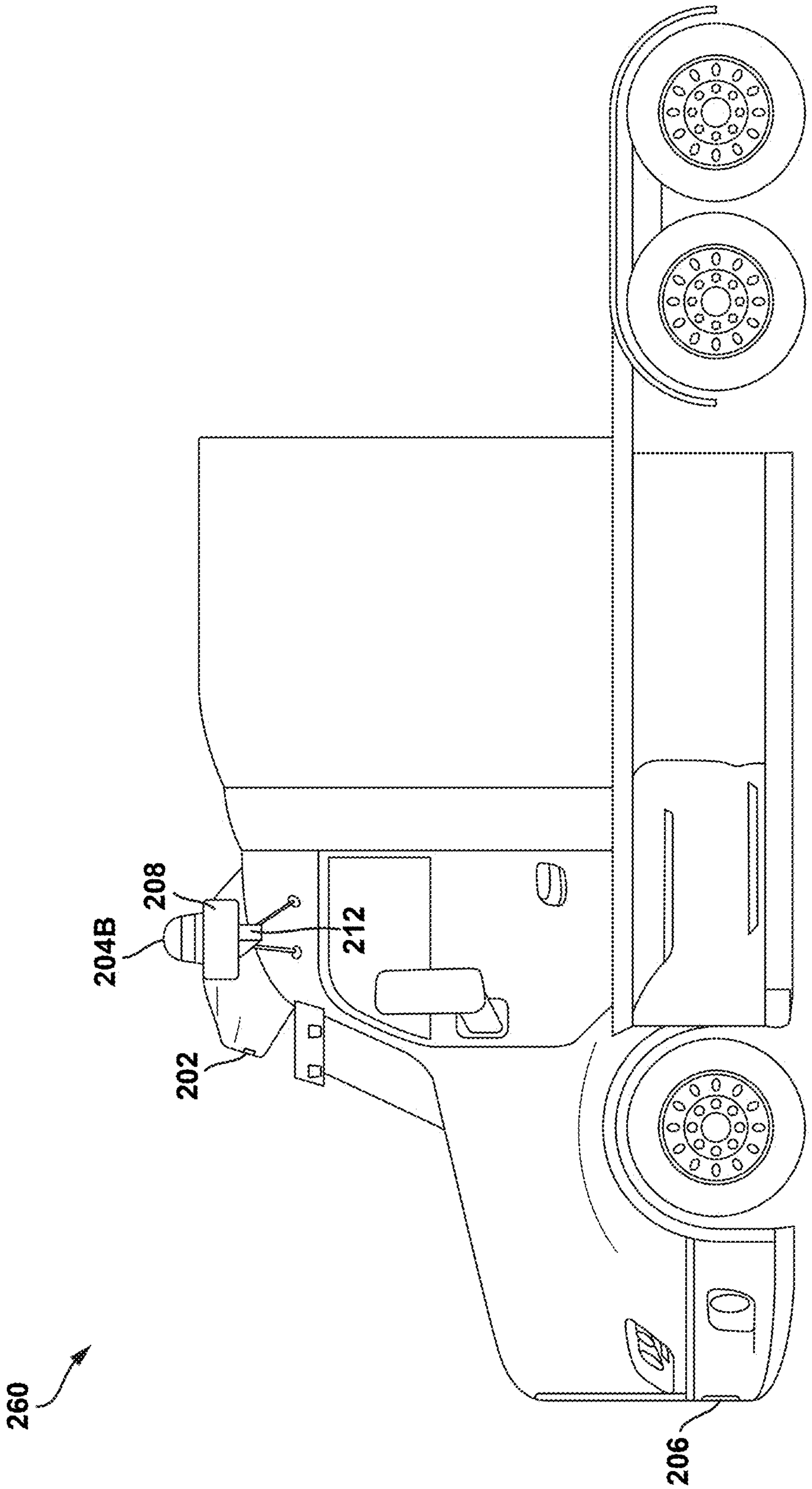
FIG. 2H is an illustration of a physical configuration of a vehicle, according to example embodiments.
Figure 2I:
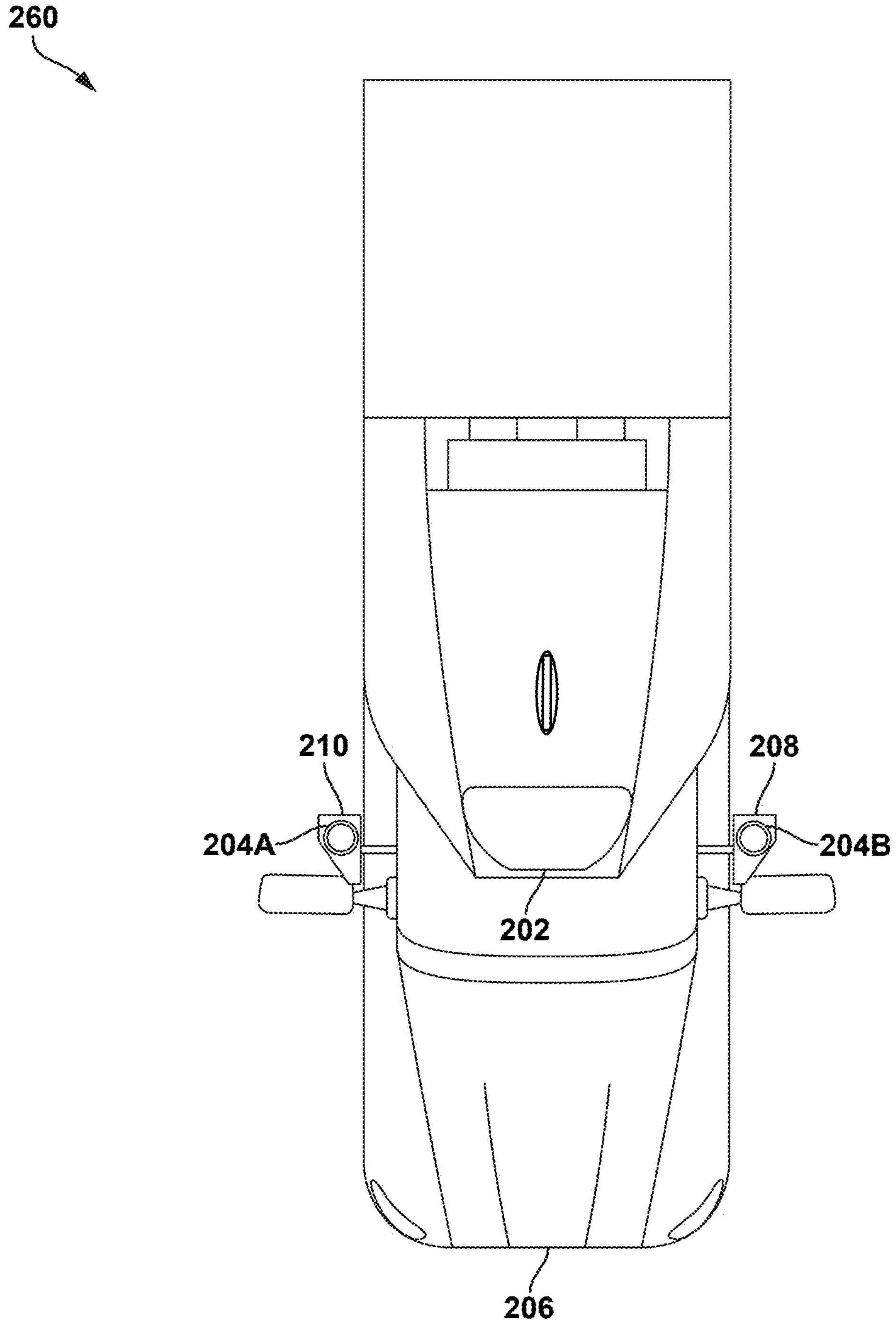
FIG. 2I is an illustration of a physical configuration of a vehicle, according to example embodiments.

As described above, in some embodiments, vehicle 200 may take the form of a van, but alternate forms are also possible and are contemplated herein. As such, FIGS. 2F-2I illustrate embodiments where vehicle 250 takes the form of a semi-truck. For example, FIG. 2F illustrates a front-view of vehicle 250 and FIG. 2G illustrates an isometric view of vehicle 250. In embodiments where vehicle 250 is a semi-truck, vehicle 250 may include tractor portion 260 and trailer portion 270 (illustrated in FIG. 2G). FIGS. 2H and 2I provide a side view and a top view, respectively, of the tractor portion 260. Similar to vehicle 200 illustrated above, vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas vehicle 200 of FIGS. 2A-2E may only include a single copy of some sensor systems (e.g., sensor system 204), vehicle 250 illustrated in FIGS. 2F-2I may include multiple copies of that sensor system (e.g., sensor systems 204A and 204B, as illustrated).

While drawings and description throughout may reference a given form of vehicle (e.g., semi-truck vehicle 250 or vehicle 200 shown as a van), it is understood that embodiments described herein can be equally applied in a variety of vehicle contexts (e.g., with modifications employed to account for a form factor of vehicle). For example, sensors and/or other components described or illustrated as being part of vehicle 200 could also be used (e.g., for navigation and/or obstacle detection and avoidance) in semi-truck vehicle 250

Figure 2J:
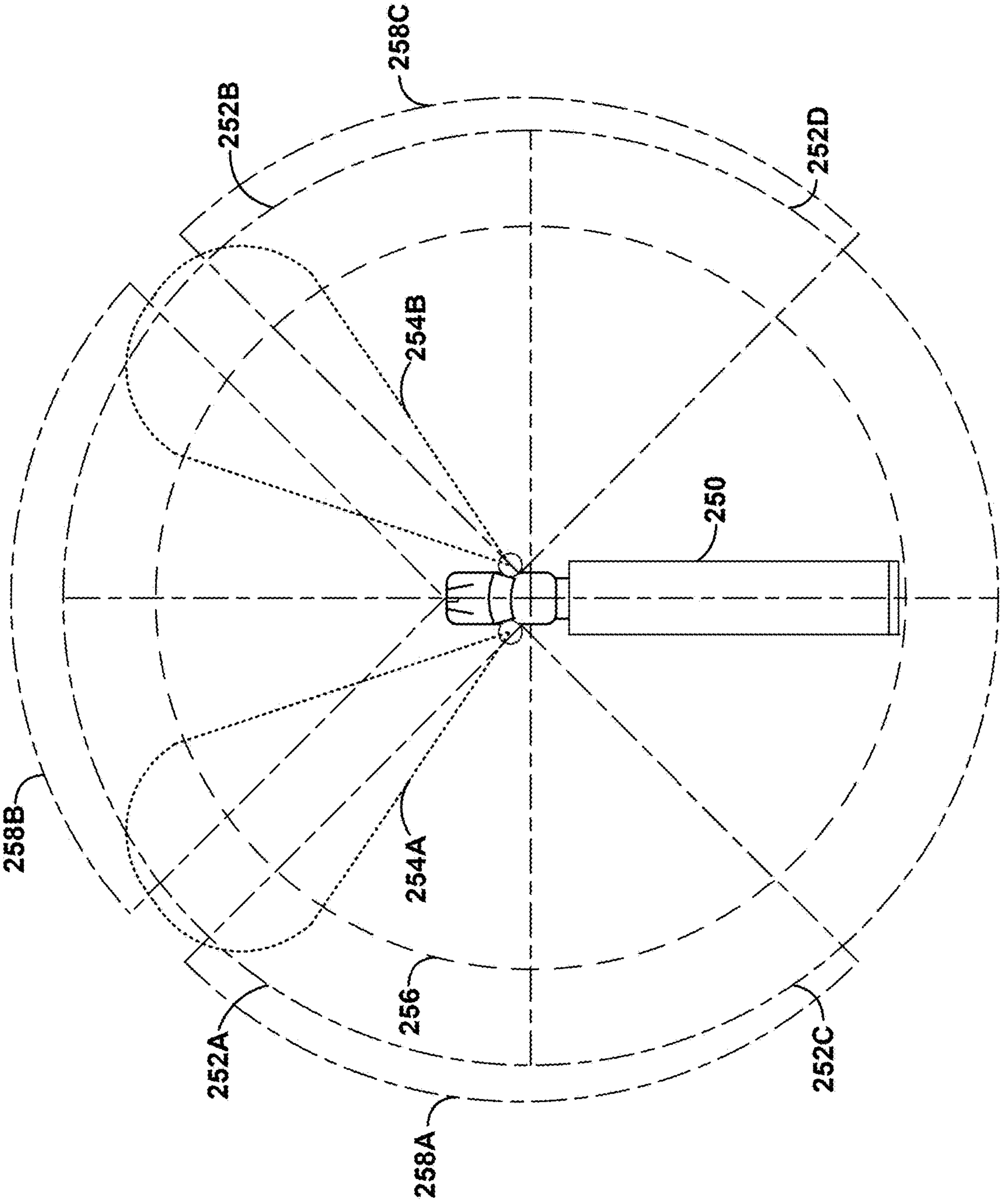
FIG. 2J is an illustration of a field of view for various sensors, according to example embodiments.

FIG. 2J illustrates various sensor fields of view (e.g., associated with vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
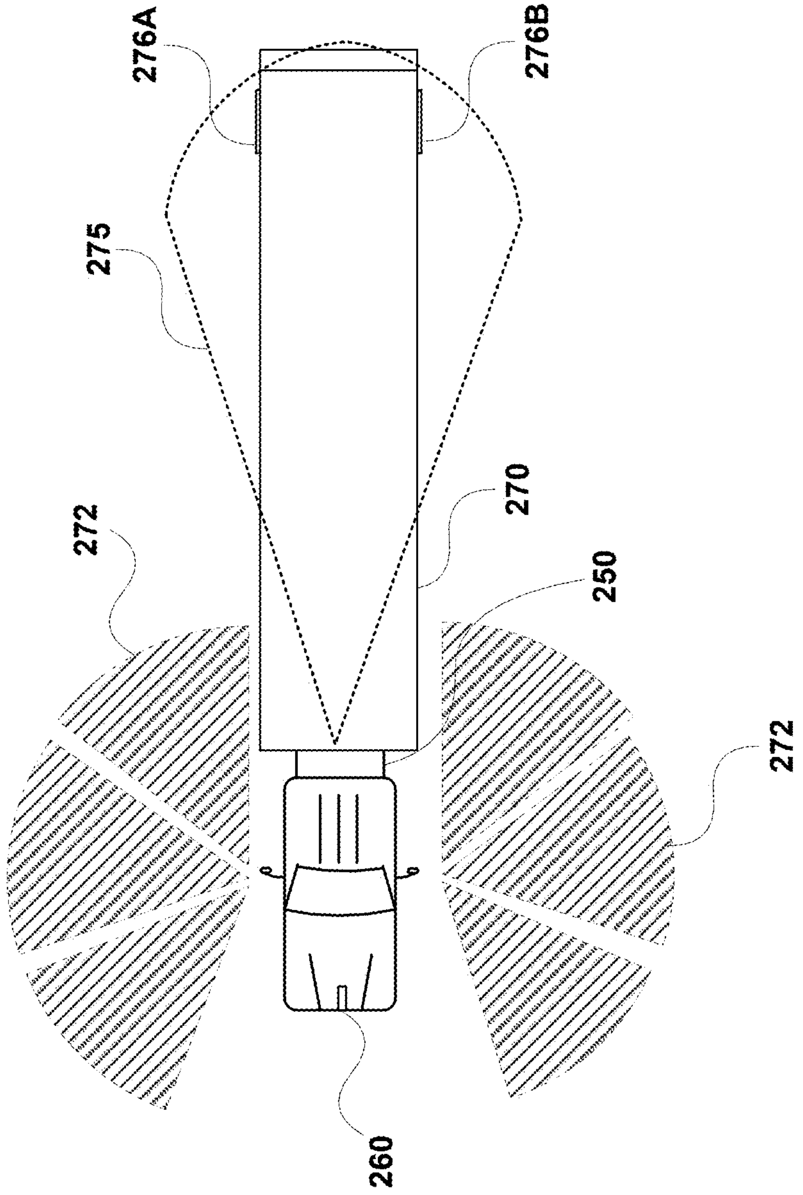
FIG. 2K is an illustration of beam steering for a sensor, according to example embodiments.

FIG. 2K illustrates beam steering for a sensor of a vehicle (e.g., vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
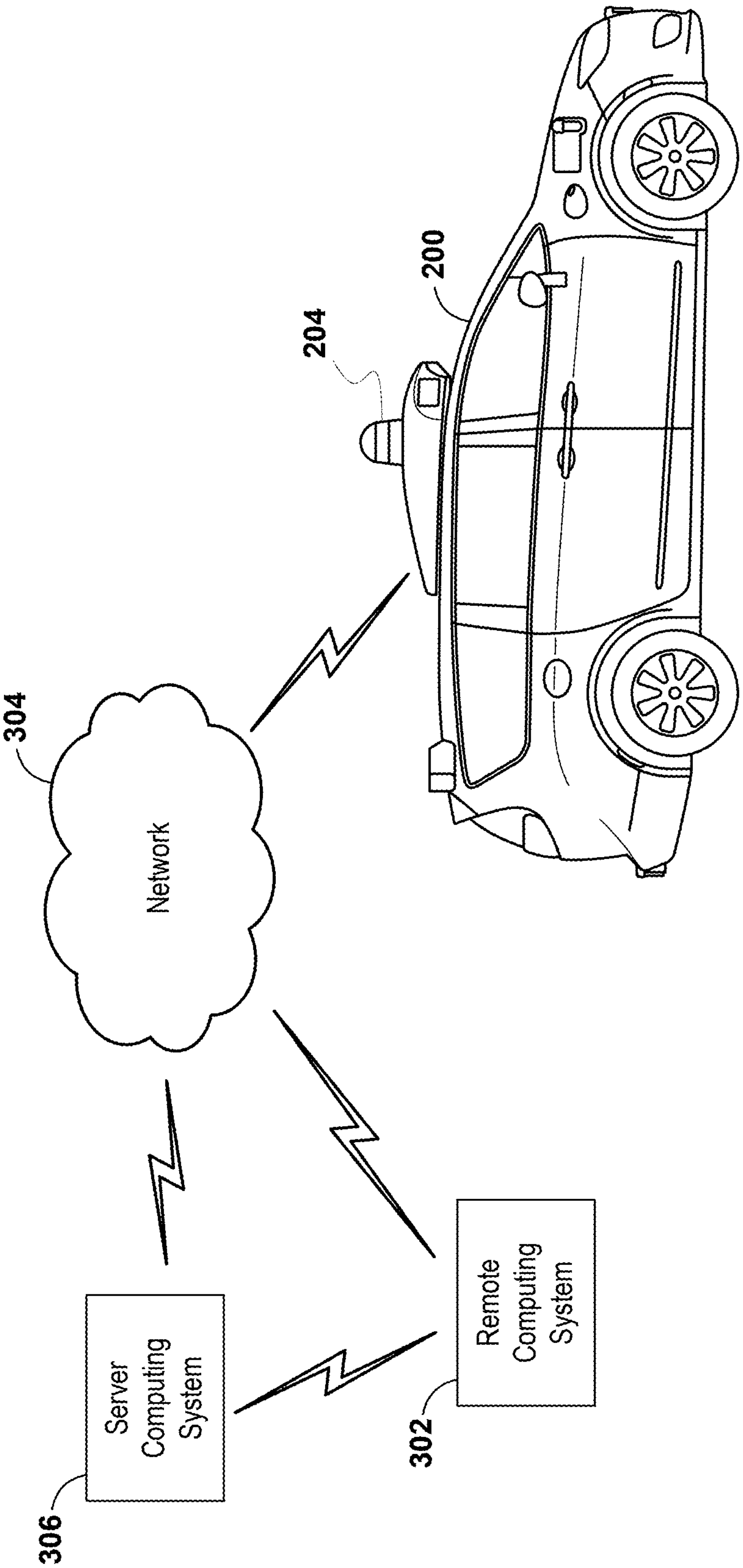
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environmental data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing the velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
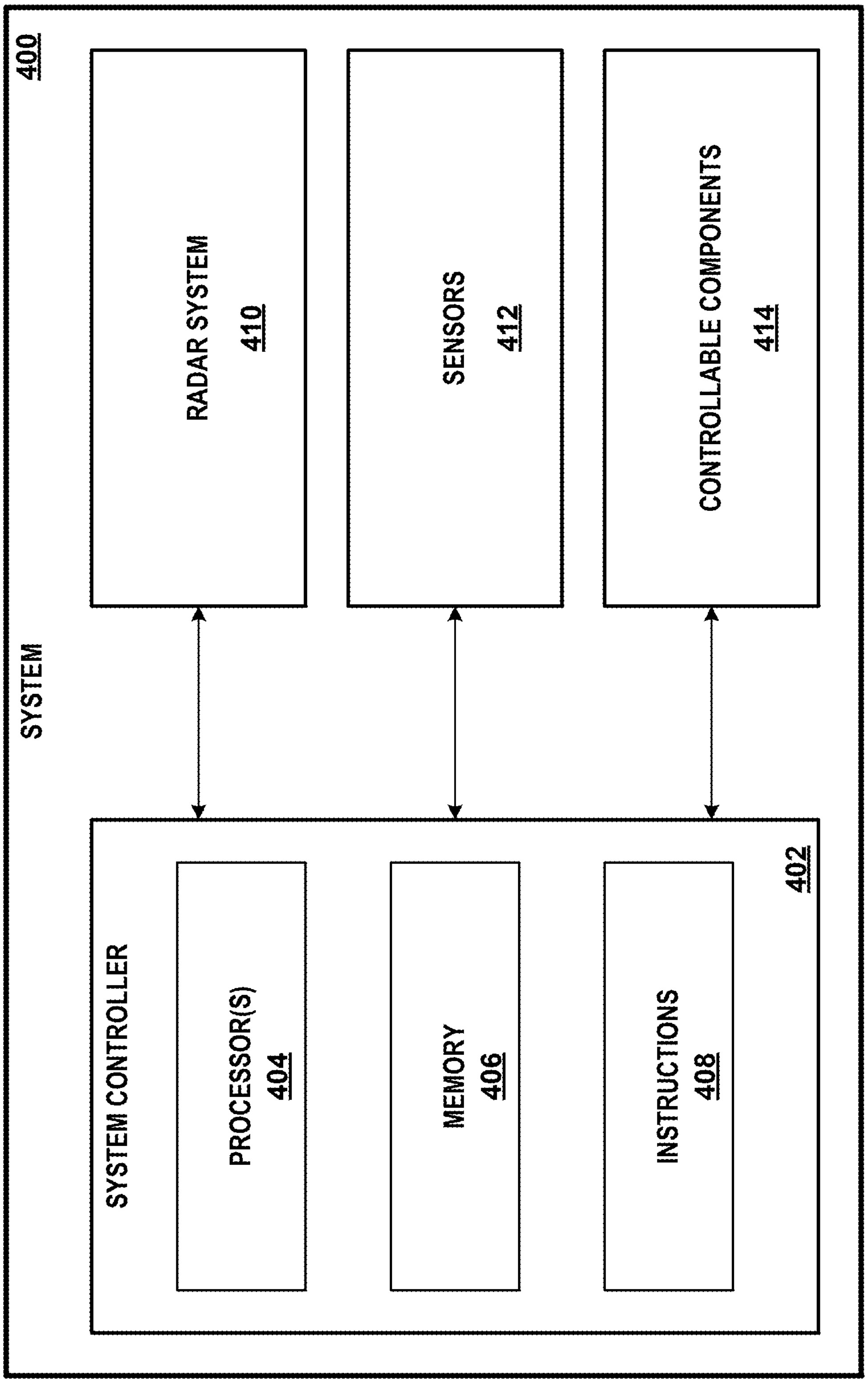
FIG. 4 is a block diagram of a system including a radar unit, according to example embodiments.

FIG. 4 is a block diagram of a system, according to example embodiments. In particular, FIG. 4 shows system 400 that includes system controller 402, radar system 410, sensors 412, and controllable components 414. System controller 402 includes processor(s) 404, memory 406, and instructions 408 stored on memory 406 and executable by processor(s) 404 to perform functions, such as the operations disclosed herein.

Processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

Memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

Radar system 410 can be used in autonomous or semi-autonomous vehicles for navigation and object detection by using radio waves to detect and measure the distance, speed, and direction of objects in the surrounding environment. Radar system 410 can include one or multiple radar units, which each consists of a radar transmitter that emits radio waves and a radar receiver that captures the reflected waves from objects. By analyzing the time it takes for the waves to return and their frequency shifts (Doppler Effect), radar system 410 can determine the presence, location, and movement of objects.

In the context of autonomous or semi-autonomous vehicles, radar system 410 provides measurements that can assist with navigation and collision avoidance. Radar units are typically mounted on the vehicle's exterior, such as the front, rear, and sides. During navigation, radar system 410 may continuously emit radio waves in various directions, scanning the environment around the vehicle. When the waves encounter an object, they bounce back to a radar receiver, thereby enabling radar system 410 to analyze the reflected waves to calculate the distance, relative speed, and angle of the object. This information can be used by the vehicle's control system to make decisions and adjust the vehicle's trajectory accordingly, enabling it to detect and react to obstacles, pedestrians, vehicles, and other potential hazards in its path. By providing real-time data about the surrounding environment, radar system 410 can enhance the vehicle's perception capabilities and contribute to safer and more reliable navigation.

Radar system 410 offers operational benefits over other types of sensors in some aspects, such as cameras and lidar. Radar can perform well in adverse weather conditions, such as rain, fog, or dust, where other sensors might be limited. In particular, radio waves emitted by radar system 410 can penetrate these adverse conditions and provide reliable object detection. This makes radar particularly useful for enhancing the robustness and safety of autonomous or semi-autonomous vehicles in various weather scenarios. In addition, radar also excels at detecting the velocity and relative speed of nearby objects, which is useful for assessing the movement of surrounding vehicles, pedestrians, and other obstacles. By providing accurate speed information, radar system 410 enables the vehicle (or a driver of the vehicle) to make informed decisions about potential collision risks and adjust its behavior accordingly. In some cases, radar system 410 can also offer a longer range of measurements and broader field of view when compared to other sensors coupled to the vehicle.

Similarly, system controller 402 may use outputs from radar system 410 and sensors 412 to determine the characteristics of system 400 and/or characteristics of the surrounding environment. For example, sensors 412 may include one or more of a GPS, an IMU, an image capture device (e.g., a camera), a light sensor, a heat sensor, one or more lidar devices, and other sensors indicative of parameters relevant to system 400 and/or the surrounding environment. Radar system 410 is depicted as separate from sensors 412 for purposes of example, and may be considered as part of or as sensors 412 in some examples.

Based on characteristics of system 400 and/or the surrounding environment determined by system controller 402 based on the outputs from radar system 410 and the sensors 412, system controller 402 may control the controllable components 414 to perform one or more actions. For example, system 400 may correspond to a vehicle, in which case the controllable components 414 may include a braking system, a turning system, and/or an accelerating system of the vehicle, and system controller 402 may change aspects of these controllable components based on characteristics determined from radar system 410 and/or sensors 412 (e.g., when system controller 402 controls the vehicle in an autonomous or semi-autonomous mode). Within examples, radar system 410 and sensors 412 are also controllable by system controller 402.

Radar system 410 and sensors 412 can be used to detect and interpret the surrounding environment during vehicle navigation. In some cases, however, the performance of radar system 410 and/or sensors 412 can be adversely affected by weather conditions such as rain, fog, or snow. Dynamic weather conditions can impact radar and other types of sensors in diverse ways. For instance, some weather conditions can cause attenuation of radar signals, leading to a degradation in the quality of the radar imagery produced by radar system 410. This degradation can, in turn, lead to overconfident driving behavior by an autonomous or semi-autonomous vehicle using radar system 410, as the vehicle systems may not accurately perceive the environment due to the degraded radar imagery.

To address potential effects on radar data and/or other types of sensor data that can be caused by inclement weather, disclosed solutions may be performed to optimize operations of radar system 410 and sensors 412 during travel in adverse weather conditions. In some cases, the disclosed solutions may be used to infer and remove the effects of weather-related attenuation on radar imagery to restore the radar imagery to how it would appear in fair weather conditions, thereby providing a more accurate representation of the environment for object detection, localization, and identification. In other cases, the disclosed solutions may be similarly used to infer and remove the effects of inclement weather on other types of sensor data, such as lidar data and images.

In addition, a system may perform disclosed techniques to monitor and adjust the vehicle control strategy based on changes in the operational ranges of the radar system and/or other sensor systems. For instance, when environment conditions reduce the sensing range of the radar system and/or another sensor system, vehicle systems may reduce the vehicle's speed to prevent the vehicle from out driving its sensor coverage. In other cases, vehicle systems may rely less (or not at all) on a sensor system or a particular sensor after determining that the operational range or performance of the sensor is degraded in the current environment.

Figure 5:
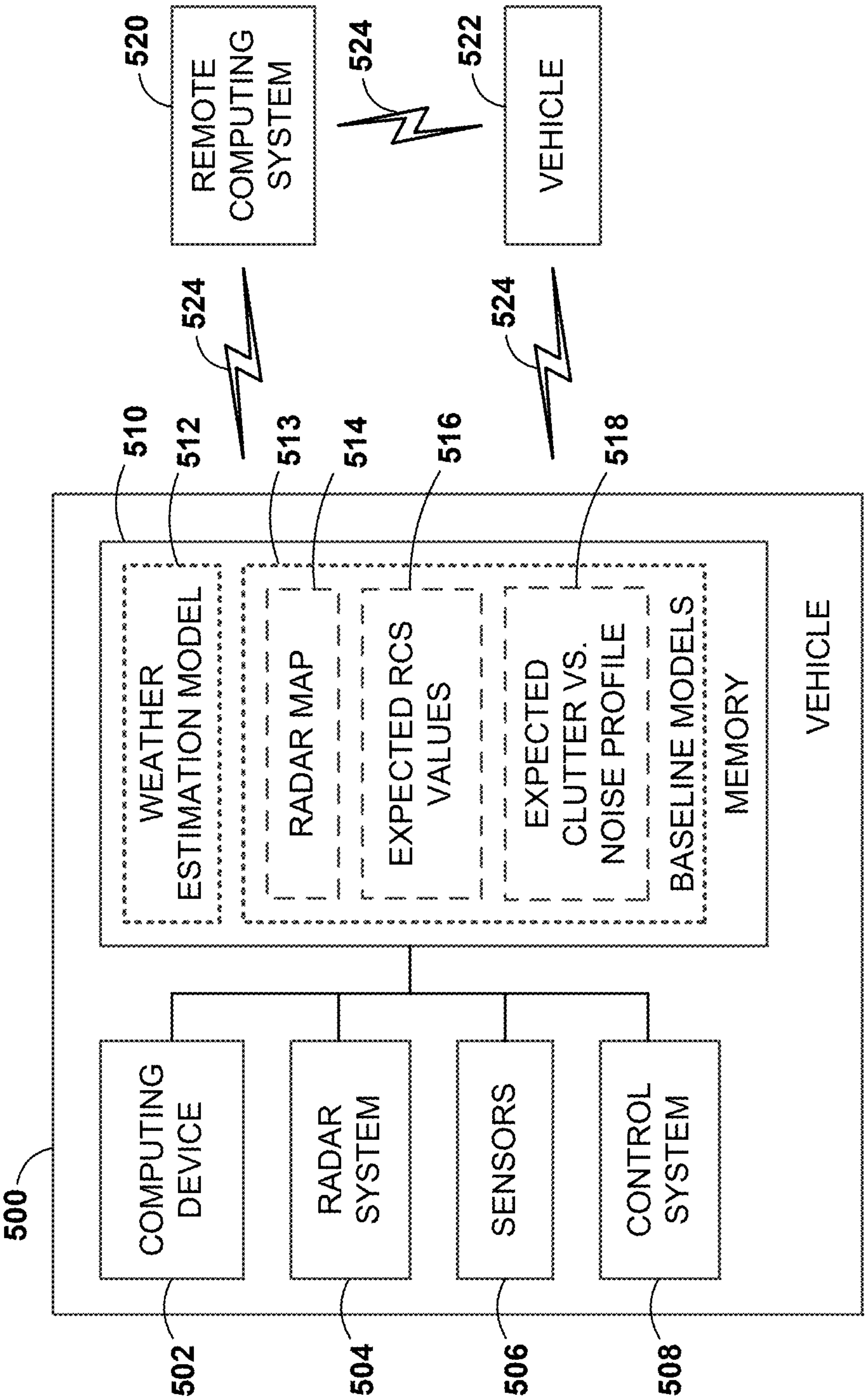
FIG. 5 is a conceptual illustration of a system for mitigating the effects of weather-related attenuation on vehicle radar data, according to example embodiments.

FIG. 5 is a conceptual illustration of a system for mitigating the effects of weather-related attenuation on vehicle radar data and other types of sensor data. In some aspects, the system may enhance the safety and reliability of autonomous operations and/or ADAS operations by evaluating the performance of radar and/or other sensor systems during navigation in adverse environmental conditions. The system may enable vehicle systems to detect changes in the quality of radar data and other types of sensor data and determine whether these detected changes should trigger some type of corrective action by the vehicle systems. In some cases, the system may detect that the current weather conditions have temporarily reduced the maximum sensing ranges of one or multiple sensors. In response, the system may decrease the vehicle's speed or perform other corrective actions that factor the reduced sensor performance.

In some examples, vehicle systems may infer and remove the effects of weather-related attenuation on radar imagery to restore the radar imagery to how the radar imagery would appear in fair weather conditions. The system may perform similar techniques to remove the effects of weather conditions from other types of sensor data. As such, the system may produce outputs that provide a more accurate representation of the vehicle's environment that vehicle systems may use for object detection and tracking and to make more informed navigation decisions. During adverse weather conditions, the corrected sensor data produced by the system may be used to help prevent overconfident autonomous vehicle driving behavior, potentially reducing the risk of accidents.

In the example shown in FIG. 5, the system may be implemented at vehicle 500 and may include computing device 502, radar system 504, sensors 506, control system 508, and memory 510. Memory 510 includes weather estimation model 512 and baseline models 513. In the example, baseline models 513 can be used as a weather loss model and includes radar map 514, expected RCS values 516, and expected clutter versus noise profile 518. As part of operations by the system, vehicle 500 may communicate with remote computing system 520 and vehicle 522 via wireless communication 524. The elements of the system are shown for illustration purposes and may include more or fewer elements within other examples. For instance, remote computing system 520 and vehicle 522 may each represent any number of computing systems and vehicles, respectively.

Vehicle 500 represents any type of mobile machine designed to transport passengers from one location to another. For instance, vehicle 500 may be a car, truck, bus, semi-truck, construction vehicle, or another type of mobile machine. In some cases, vehicle 500 may be a robotic device or another specialized vehicle. In some examples, vehicle 500 is an autonomous or semi-autonomous vehicle that uses sensor data from radar system 504 and/or sensors 506 to understand the surrounding environment to safely navigate between locations.

Computing device 502 may represent one or more computing devices configured to perform operations for vehicle 500, including methods described herein. In some aspects, computing device 502 includes a processor and a memory storing instructions that, when executed by the processor, cause computing device 502 to perform various operations. The memory may correspond to memory 510 or another memory specific to computing device 502. The operations performed by computing device 502 may include estimating weather conditions for the environment of vehicle 500 using weather estimation model 512, determining weather-related attenuation effects on the radar imagery based on the estimated weather conditions, removing the weather-related attenuation effects to correct the radar imagery, and providing the corrected radar imagery to control system 508 of vehicle 500. Computing device 502 may perform variations of these operations in some cases.

During navigation by vehicle 500, computing device 502 may receive radar data generated by radar system 504, which may use one or multiple radars to generate the radar data representing the environment of vehicle 500. The radar data can be processed in various formats, such as radar imagery. In some examples, radar system 504 may output radar data in range-Doppler maps (RDMs), which are two-dimensional representations that plot the distance of objects from the radar sensor against their relative velocity. The range dimension indicates how far away an object is while the Doppler dimension shows whether the object is moving towards or away from the radar sensor and at what speed. RDMs can be useful for detecting and tracking moving objects, such as other vehicles (e.g., vehicle 522). In addition, radar system 504 may output radar data in range-angle images, which provide a two-dimensional view where one axis represents the distance to the target and the other represents the angle of arrival of the radar signal. Range-angle images can be useful for determining the azimuth or bearing of objects relative to the vehicle, which can help in creating a spatial map of the environment around the vehicle.

Computing device 502 may also receive sensor data from one or more sensors 506. In some examples, sensors 506 can include various types of sensors, such as cameras, lidar, temperature sensors, wind sensors, humidity sensors, and/or ultrasonic sensors. Sensors 506 may be configured to detect various environmental conditions, such as temperature, humidity, wind speed, or visibility. Sensors 506 may also be used to detect weather conditions, such as rain, fog, or snow. The sensor data output by sensors 506 may be used to supplement the radar imagery from radar system 504, providing additional information about the environment of vehicle 500.

Vehicle 500 also includes control system 508, which may manage and regulate the operations of vehicle 500. In some examples, control system 508 and computing device 502 may be part of a computing system used to perform various operations for vehicle 500. Control system 508 may perform a wide range of functions, from basic vehicle maneuvers to complex decision-making processes for autonomous or semi-autonomous navigation. In some aspects, control system 508 may perform functions, such as steering control, acceleration and braking, stability and traction control, navigation and route planning, and obstacle detection and avoidance. The components within control system 508 may include sensors, actuators, electronic control units (ECUs), and communication networks. In some examples, control system 508 may work with computing device 502 to process data from various sensors to perceive the environment, make complex decisions based on the data, and control movements of vehicle 500 accordingly. Control system 508 may also continuously monitor performance and safety parameters to ensure vehicle 500 operates within safe limits. Control system 508 may rely on accurate sensor data to make informed decisions. As such, corrected radar imagery, which has been compensated for weather-related effects, can be a useful input for control system 508.

Computing device 502 may use memory 510, which can be used to store data and models. For instance, memory 510 may store weather estimation model 512 and baseline models 513. In the example, baseline models 513 includes radar map 514, expected RCS values 516, and expected clutter versus noise profile 518. Weather estimation model 512 may be used by the computing device 502 to estimate weather conditions for the environment of the vehicle 500. Radar map 514, expected RCS values 516, and expected clutter versus noise profile 518 may be used by computing device 502 infer the impact of inclement weather on radar data enabling computing device 502 to correct the radar data by removing weather-related attenuation effects.

Computing device 502 may perform disclosed methods to determine a real-time estimation of radar sensitivity degradation. The real-time estimation may allow for immediate adjustments to be made to radar system 504 or the control strategy for vehicle 500 to enhance the safety and reliability of autonomous vehicle operations. For example, if the radar sensitivity is determined to be severely degraded due to heavy rain, control system 508 may cause vehicle 500 to slow down or perform other precautionary measures. Decreasing the speed of vehicle 500 can help prevent vehicle 500 from driving too fast relative to its sensor coverage of the surrounding environment. In some cases, weather conditions may reduce the max sensing range of radar system 504 and/or sensors 506, which can trigger computing device 502 and/or control system 508 to reduce the speed of vehicle 500 to accommodate the reduced operational capabilities.

Vehicle 500 may engage in wireless communication 524 with remote computing system 520 and vehicle 522. Wireless communication 524 may allow for data exchange or collaborative processing between vehicle 500, remote computing system 520, and vehicle 522. For example, vehicle 500 may share radar imagery, sensor data, or corrected radar imagery with remote computing system 520 and/or vehicle 522. Similarly, vehicle 500 may receive radar imagery, sensor data, or corrected radar imagery from remote computing system 520 or vehicle 522. This collaborative processing may enhance the accuracy and reliability of the radar imagery correction process.

Weather estimation model 512 represents a computational tool or algorithm designed to infer current weather conditions of the environment of vehicle 500 based on various input data sources. In some examples, vehicle 500 may leverage weather estimation model 512 in conjunction with onboard sensors (e.g., radar system 504 and sensors 506) to accurately estimate weather conditions in the environment. For instance, weather estimation model 512 may be trained to map raw backscatter values in radar imagery to an estimated rain rate. Weather estimation model 512 may similarly map raw backscatter values in radar imagery to an estimated precipitation falling rate associated with snow, hail, or another type of weather.

In some examples, weather estimation model 512 may integrate sensor data with predictive modeling to ensure vehicle 500 has a real-time understanding of its surroundings. Sensors 506, which may include LIDAR, optical cameras, temperature sensors, and other meteorological sensors like hygrometers and thermometers, can be used to continuously collect environmental data that provides information on precipitation, temperature, humidity, and visibility. Weather estimation model 512 may be used to analyze the sensor data to identify patterns or signatures that correspond to specific weather conditions, such as rain, fog, or snow. In some cases, weather estimation model 512 may use machine learning techniques, statistical analysis, and/or physical principles to interpret the sensor signal characteristics and deduce the weather conditions.

As an example, weather estimation model 512 may estimate the rain rate of the environment by examining the attenuation and scattering patterns in the radar signals caused by raindrops. In some instances, weather estimation model 512 may also incorporate data from additional sensors 506 that measure visibility, humidity, and/or temperature to refine its estimations. The output of weather estimation model 512 may then be used to determine the weather-related attenuation effects on the radar imagery, which can then be corrected to provide a more accurate representation of the environment for control system 508.

In another example, weather estimation model 512 may estimate rain rate or rain droplet size by analyzing the reflectivity of radar signals. The signals' reflectivity can be influenced by the size and concentration of rain droplets, with larger and denser droplets reflecting more radar energy and producing a stronger return signal. In some instances, radar system 504 may transmit and receive radar pulses with different polarizations to detect the variation in reflectivity between these polarizations, which can provide insights into the droplet shape and size since rain droplets tend to flatten as they increase in size. Additionally, weather estimation model 512 may factor the Doppler shift in the radar signal, which offers information about the velocity of falling rain droplets that can further aid in the estimation of rain rate.

In some cases, weather estimation model 512 may also factor the attenuation and scattering patterns in the radar signals, which are affected by interactions with rain droplets. These interactions vary with droplet size, which may enable weather estimation model 512 to estimate the size distribution within the rain. To enhance accuracy, weather estimation model 512 may incorporate environmental data (e.g., ambient temperature and humidity) that can affect droplet formation and size. By integrating these analytical techniques and environmental data, weather estimation model 512 may provide detailed estimations of rain rate and droplet size, which can then be used to calibrate the sensitivity of radar system 504 or to correct radar imagery to enable more precise object detection and ranging in adverse weather conditions.

In some examples, weather estimation model 512 may also be used to analyze the impact of snow or high winds on radar signal characteristics. For snow, weather estimation model 512 may analyze the volume scattering properties of radar signals since snowflakes might have different scattering signatures compared to rain due to their shape, size, and lower density. Weather estimation model 512 may be used to differentiate between types of snowfall (e.g., light, fluffy snow versus wet, heavy snow) by examining the amplitude and phase shift of received radar signals. In some cases, weather estimation model 512 may be able to detect wind speed and direction by evaluating the Doppler shift variations in radar signal caused by moving debris or vegetation that are agitated by the wind.

The generation and calibration of weather estimation model 512 may help ensure the predictions by weather estimation model 512 accurately reflect real-world weather conditions. The initial phase of calibration may occur in a controlled environment, such as a laboratory, where specific weather conditions can be artificially generated and standardized. For calibrating the rain estimator aspect of weather estimation model 512, various intensities and types of rainfall can be simulated to observe the signal attenuation and reflectivity. The process may involve creating conditions ranging from light drizzles to heavy downpours, allowing the radar to capture a wide spectrum of data on raindrop size, distribution, and the resulting radar signal characteristics. The goal of this process is to establish a comprehensive dataset that represents the radar's performance under varied precipitation scenarios.

In some cases, the calibration process may use known rain rates and known target RCS values to prepare weather estimation model 512. This calibration process may help to ensure that the rain rate estimator model accurately infers rain rates and RCS values from radar imagery under various weather conditions. In some cases, the calibration process may be repeated periodically or as-needed to maintain the accuracy of the rain rate estimator model.

In addition to rain, the calibration process may also prepare weather estimation model 512 for other weather conditions, such as snow and fog. For snow, the calibration process may involve simulating how different snowfall densities and types affect radar signals. For instance, the process may test a range extending from fine, powdery snow to wet, heavy flakes. Calibrating weather estimation model 512 for fog may involve analyzing the attenuation and scattering effects caused by water droplets suspended in the air, which can vary in density and distribution. The tests can enable the collection of data that indicates how these conditions alter the return strength and clarity of received radar signals. For calibrating weather estimation model 512 to analyze wind conditions, the calibration setup may include moving objects and vegetation to copy the dynamic environment often experienced by vehicles.

Following the controlled calibration, weather estimation model 512 may be further refined through real-world operational testing. For instance, as vehicle 500 equipped with radar system 504 navigates different environments, radar system 504 may continuously gather radar imagery alongside actual weather data. This real-time data acquisition by vehicle 500 and other vehicles (e.g., vehicle 522) allows for weather estimation model 512 to adapt and fine-tune its algorithms, enhancing its predictive capabilities for a wide range of weather conditions. Weather estimation model 512 may be configured to use advanced machine learning techniques to analyze this data, adjusting its parameters to more accurately reflect the impact of weather on radar signals.

In addition, to augment the calibration process, weather estimation model 512 can also incorporate external data sources, such as meteorological stations or collaborative data-sharing from a network of vehicles. For instance, vehicle 500 may receive additional data from remote computing system 520 and/or vehicle 522. Additional data can provide a broader context for updating weather estimation model 512, which may enable weather estimation model 512 to be modified to understand regional weather patterns and their specific effects on radar performance.

In some examples, weather estimation model 512 may be generated onboard vehicle 500 through the use of radar system 504, sensors 506, and computing capabilities. For instance, radar system 504 and sensors 506 may be used to collect data on local weather conditions, such as precipitation, temperature, humidity, and visibility. The collected data may then be processed by computing device 502, which may use machine learning algorithms to analyze the collected information and generate (or update) weather estimation model 512 based on the environment of vehicle 500. Weather estimation model 512 may be continuously updated as new data is gathered, which can allow for real-time adjustments.

In other examples, weather estimation model 512 may be received from remote computing system 520, which may be a centralized server or a cloud-based platform that aggregates and processes large volumes of environmental and weather data from various sources, including satellite imagery, weather stations, and a network of vehicles. Remote computing system 520 may use the data from various sources to develop a comprehensive and up-to-date weather estimation model 512 that may factor broader weather patterns and regional variations. Weather estimation model 512 may then be transmitted to individual vehicles via wireless communication 524 on wireless communication networks. This approach may enable vehicle 500 and other vehicles (e.g., vehicle 522) to receive models that are based on local sensor data and improved with extensive meteorological insights, providing a more accurate and reliable assessment of weather conditions.

In some cases, weather estimation model 512 may be received by vehicle 500 based on a geographic location or a route for vehicle 500. For instance, computing device 502 may receive a version of weather estimation model 512 that is specific to a particular geographic location or a route that vehicle 500 is expected to traverse. The location or route-specific weather estimation model may provide more accurate weather estimation for the environment of vehicle 500, as it may take into account the specific weather patterns or conditions associated with the geographic location or the route. In some cases, the geographic location may be determined based on a Global Positioning System (GPS) signal received by vehicle 500. In other cases, the route for the vehicle may be determined based on a navigation system of vehicle 500. The use of a geographic location or a route for receiving the weather estimation model may enhance the accuracy of weather estimation and improve the correction of radar imagery.

In order to correct sensor data, computing device 502 may determine weather-related attenuation effects on the sensor data. For instance, computing device 502 may use the estimated weather conditions to determine how to correct incoming radar imagery generated by radar system 504. Anticipating the weather-related attenuation effects on sensor data may involve the use of one or multiple baseline models 513. In the example shown in FIG. 5, baseline models 513 includes radar map 514, expected RCS values 516, and expected clutter versus noise profile 518. In other examples, baseline models 513 may include other data that can be used to detect any weather-related effects on radar data or other types of sensor data.

In general, a baseline model is a reference framework or set of data that represents the normal or expected conditions of sensor data (e.g., radar data) when the weather is clear, described herein as fair weather conditions. Each baseline model may serve as a standard against which current sensor data can be compared to identify anomalies or deviations caused by weather-related factors. Baseline models 513 can be used to determine weather-related attenuation by providing a benchmark for how radar signals would interact with the environment and various objects under ideal conditions.

Radar map 514 corresponds to a model that depicts expected radar returns in fair weather conditions. In particular, radar map 514 may provide a pre-established reference for how the radar imagery of the surrounding environment, including roads, buildings and other static objects, would typically appear without any weather interference. In some cases, a common radar map may be used for all vehicles. This common radar map may be a standardized map that is used across a fleet of vehicles. In other cases, each vehicle may develop its own radar map. This individual radar map may be specific to the vehicle and may be developed based on the vehicle's own radar data and experiences.

Expected RCS values 516 may provide a reference for the RCS of objects in the environment of vehicle 500 and may be organized based on object types, such as vehicles, buildings, traffic signs, pedestrians, etc. The RCS is a measure of how detectable an object is by radar. As such, expected RCS values 516 may provide a reference for the radar signature of different objects in the absence of weather effects, which can be used to determine the impact of inclement weather on radar imagery.

Expected clutter versus noise profile 518 may represent the anticipated levels of clutter (unwanted radar echoes from stationary objects) and noise (random and background electromagnetic interference) in the radar signal under clear weather conditions. In some cases, expected clutter versus noise profile 518 may represent the anticipated levels of clutter and noise under other weather conditions, which can be used for comparison to radar imagery recently generated by radar system 504.

By comparing real-time radar data against one or more baseline models 513, discrepancies attributed to weather, such as increased noise or signal attenuation due to rain, fog, or snow, can be identified. The system can then apply corrections to the radar imagery to account for these weather-related effects, thereby maintaining the accuracy and reliability of the radar system's 504 perception of the environment. In some instances, the corrected radar imagery may be provided to control system 508, which may use the corrected radar imagery to control the operations of vehicle 500. This may enhance the safety and reliability of autonomous vehicle operation by providing more accurate radar data, regardless of weather conditions.

In some examples, computing device 502 may compare current radar data products or summary metrics at a specific location against historical data varying from undegraded to heavily degraded. The comparison may allow for computing device 502 to infer the level of degradation of the radar data from one or more radars from radar system 504, which can then be used to correct the radar imagery. The corrected radar imagery may then be provided to control system 508 of vehicle 500, which may use the corrected radar imagery to control vehicle 500.

The removal of weather-related attenuation effects may involve adjusting the observed radar data based on identified differences. For example, if the observed radar data shows a lower signal strength than one or more baseline models 513 due to rain attenuation, the signal strength may be increased to match the expected baseline. Similarly, if the observed radar data shows a higher noise level than one or more baseline models 513 due to snowfall, the noise level may be reduced to match the baseline expectation. These adjustments may help to restore the radar imagery to how it would look under fair weather conditions.

In some configurations, the removal of weather-related attenuation effects may involve applying a correction factor to the observed radar data. The correction factor may be determined based on identified differences and may be used to adjust the observed radar data to match the a priori expectation. The correction factor may be applied to various aspects of the observed radar data, such as the signal strength, the noise level, the RCS values, or the clutter versus noise profile. The application of the correction factor may help to correct the radar imagery, which can increase the accuracy of the representation of the environment of vehicle 500.

In some aspects, the corrected radar imagery may be provided to control system 508 of vehicle 500, which may use the corrected radar imagery to control operations, such as steering, acceleration, braking, or obstacle avoidance. By using the corrected radar imagery, control system 508 may be able to make more accurate decisions, potentially enhancing the safety and reliability of autonomous vehicle operation.

In some cases, a representation of the detected object may be displayed relative to vehicle 500. The display may be provided on a display interface of vehicle 500, such as a dashboard display, a head-up display, or a mobile device connected to vehicle 500. The representation of the object may include various information about the object, such as the type of the object, the distance of the object from the vehicle, the relative velocity of the object with respect to the vehicle, or the direction of the object relative to vehicle 500. The representation of the object may be updated in real-time based on the corrected radar imagery, providing the driver and passengers or control system 508 of vehicle 500 with up-to-date information about the environment of vehicle 500. This display of the representation of the object relative to the vehicle may enhance the situational awareness of the driver or control system 508, potentially improving the decision-making process for vehicle operations.

In some examples, weather estimation model 512 and baseline models 513 may be combined into a single model that is used by vehicle 500 as well as other vehicles (e.g., vehicle 522). As such, machine learning techniques within the model can make predictions based on past data and current observations, adjusting operations by vehicle systems to the detected conditions. For instance, if the model estimates heavy rain, vehicle 500 can adjust radar system 504 to account for signal attenuation caused by the rain and also use the information to adapt its driving strategy. This might involve slowing down to maintain safe stopping distances in wet conditions and to avoid driving beyond the vehicle's visibility of its surroundings. In some cases, vehicle 500 may alter its route to avoid areas with adverse weather. Additionally, computing system 502 may use the weather data to adjust sensor parameters for better performance, such as changing the sensitivity of the radar to improve object detection in fog, increasing or decreasing power used by a sensor or sensor system, among other operations.

Figure 6:
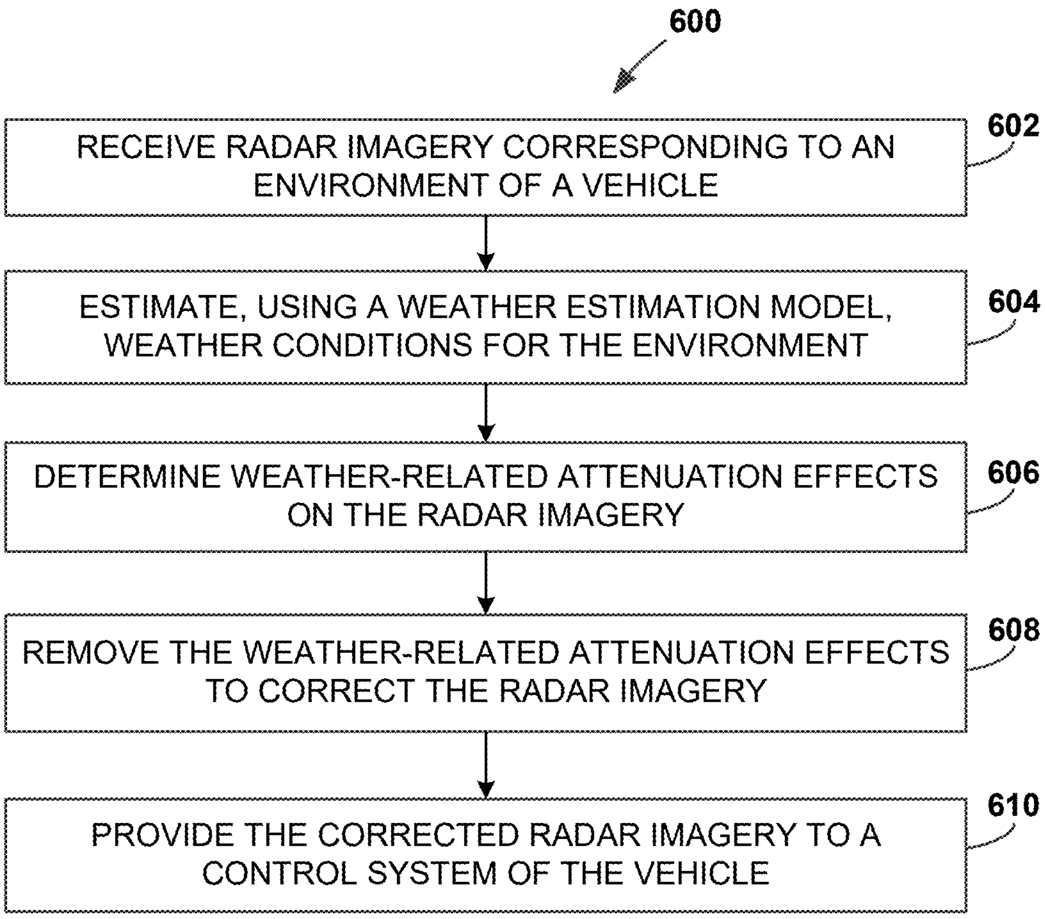
FIG. 6 is a flowchart of a method for mitigating the effects of weather-related attenuation on vehicle radar data, according to example embodiments.

FIG. 6 is a flow chart of method 600 for mitigating weather-related attenuation effects on radar imagery. Method 600 may include one or more operations, functions, or actions as illustrated by one or more of blocks 602, 604, 606, 608, and 610. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. Various types of computing systems can be used to perform method 1100 and other methods described herein.

In some examples, the computing system performing disclosed techniques may include one or multiple processors, which may be part of the same or different computing devices. The computing system may be located onboard the vehicle and may communicate with one or more remotely positioned computing devices. In some examples, a specialized type of processor may perform method 600. For instance, one or more application-specific integrated circuits (ASICs) and/or field programmable gate arrays (FPGAs) may perform method 600. As an example, an ASIC or FPGA may perform one or more blocks of method 600. In some cases, a computing system may perform method 600 for different radars to compare the relative performance of the radars.

At block 602, method 600 involves receiving radar imagery corresponding to an environment of a vehicle. The radar imagery may be generated by a radar system, such as radar system 504 shown in FIG. 5. The radar imagery may convey information representing positions and movements of various objects and weather conditions in the vehicle's surrounding environment.

At block 604, method 600 involves estimating, using a weather estimation model, weather conditions for the environment. The weather estimation model may infer the weather conditions in the environment based on information from one or multiple sources. For instance, the weather estimation model may be used to analyze radar imagery to estimate environmental conditions, such as the rate at which precipitation is falling. In some cases, the computing system may incorporate sensor data from other sensors to determine the conditions of the environment. For instance, the computing system may estimate weather conditions for the environment by using sensor data from one or more non-radar sensors, such as lidar, camera, and other types of sensors. The computing system may then estimate the weather conditions for the environment based at least in part on the sensor data.

The weather estimation model used by the computing system may include a rain rate estimator. The rain rate estimation may be configured to map raw backscatter values in the radar imagery to a rain rate estimate for the environment of the vehicle. In some cases, the rain rate estimator model may be trained in a closed radar chamber equipped with synthetic rain produced at known rain rates falling from the ceiling.

At block 606, method 600 involves determining weather-related attenuation effects on the radar imagery. The weather-related attenuation effects on the radar imagery may be determined based on the estimated weather conditions. The attenuation effects may represent the degradation in the quality of the radar imagery due to the weather or other environmental conditions, such as rain, fog, or snow.

At block 608, method 600 involves removing the weather-related attenuation effects to correct the radar imagery. The removal of the attenuation effects may involve adjusting the radar data based on the determined attenuation effects, thereby restoring the radar imagery to how it would appear under fair weather conditions.

In some examples, removing the weather-related attenuation to correct the radar imagery involves mapping, using a weather loss model, the rain rate estimate to aperture and atmospheric losses in return signal strength corresponding to the radar imagery and performing one or more corrective actions based on the aperture and atmospheric losses in return signal. For instance, the computing system may provide a signal to the control system to reduce the speed of the vehicle. In some cases, the computing system may determine an offset based on the aperture and atmospheric losses in return signal strength corresponding to the radar imagery and apply the offset to correct the radar imagery.

In some examples, removing the weather-related attenuation effects to correct the radar imagery involves comparing the estimated weather conditions for the environment to a baseline model corresponding to fair weather conditions and removing the weather-related attenuation effects based on the comparison. The baseline model may include a radar map representing radar imagery generated during fair weather conditions. In some instances, the computing system may receive a set of radar imagery representing the environment of the vehicle, determine the environment of the vehicle has fair weather conditions, and modify the baseline model based on the set of radar imagery. The computing system may receive the baseline model from a remote computing system based on a location or route of the vehicle.

In some cases, the baseline model includes a set of expected RCS values for a plurality of object types and/or an expected clutter versus noise profile having a clutter profile based on a median power of stationary pixels as a function of range and a noise profile being a median power of non-stationary pixels as a function of range.

In some cases, the removal of weather-related attenuation effects may involve adjusting the observed radar data based on the identified differences relative to one or more baseline models. For example, if the observed radar data shows a lower signal strength than the expected strength represented by a baseline model due to rain attenuation, the signal strength may be increased to match the expected strength. Similarly, if the observed radar data shows a higher noise level than an a priori expectation due to snowfall, the noise level may be reduced to match the a priori expectation. These adjustments may help to restore the radar imagery to how it would look under fair weather conditions.

In some configurations, the removal of weather-related attenuation effects may involve applying a correction factor to the observed radar data. The correction factor may be determined based on the identified differences and may be used to adjust the observed radar data to match the a priori expectation. The correction factor may be applied to various aspects of the observed radar data, such as the signal strength, the noise level, the RCS values, or the clutter versus noise profile. The application of the correction factor may help to correct the radar imagery, providing a more accurate representation of the environment for the autonomous vehicle.

At block 610, method 600 involves providing the corrected radar imagery to a control system of the vehicle. The control system may use the corrected radar imagery to control the operations of the vehicle, such as steering, acceleration, braking, or obstacle avoidance. By providing the control system with corrected radar imagery, the method may enhance the safety and reliability of autonomous vehicle operation by providing more accurate radar data, regardless of weather conditions.

In some examples, method 600 may also involve detecting a decrease in a sensing range for a radar coupled to the vehicle. The computing system may then provide an output to one or more vehicle systems that conveys the detected decrease in the sensing range for the radar. In addition, method 600 may involve degrading, using the weather loss model, radar imagery received during fair weather conditions. The degraded radar imagery can be used for calibration tests and/or future training of the models.

In some examples, the computing system may compare RCS values in the radar imagery to a baseline model representing RCS values for objects during fair weather conditions. In some cases, the computing system may determine that a difference between the RCS values in the radar imagery and the RCS values of the baseline model exceeds a threshold difference. The computing system may then perform one or more corrective actions based on determining that the difference between the RCS values in the radar imagery and the RCS values of the baseline model exceeds the threshold difference.

As an example, the computing system may use a baseline model that comprises a radar map representing radar imagery generated during fair weather conditions. The computing system may then compare RCS values in the radar imagery to RCS values for one or more objects specified by the radar map based on a location of the vehicle. In some cases, the computing system may receive a set of radar imagery representing the environment of the vehicle, determine the environment of the vehicle has fair weather conditions, and modify the baseline model based on the set of radar imagery.

In some examples, the computing system may receive the baseline model from a remote computing system and based on a location of the vehicle.

In some examples, the computing system may use a neural network to remove the weather-related attenuation effects based on the estimated weather conditions for the environment. The neural network can be trained to mitigate weather-related attenuation effects on radar imagery or other sensor data by leveraging a comprehensive dataset that pairs affected sensor readings with their corresponding clean, unattenuated states. During the training phase, the neural network can adjust its internal parameters to minimize discrepancies between its output and the clean data, effectively learning the transformation that corrects for weather-induced distortions. The process can involve feature extraction to identify patterns in the data that are indicative of weather effects, such as reduced signal strength or increased noise due to precipitation. Once trained, the neural network may apply its learned transformations to new, incoming sensor data (e.g., radar imagery), first by inferring the present weather conditions and then by estimating their impact on signal quality. The neural network may then correct the data by compensating for these estimated effects, thus restoring the data to a representation that more accurately reflects the actual environment without weather interference. The output produced by the neural network may be a corrected set of sensor data that provides a more reliable basis for the vehicle's control system and other applications, which may enhance the vehicle's ability to navigate and respond to its surroundings under various weather conditions.

In some aspects, the corrected radar imagery may be used to detect an object in the environment of the vehicle. The computing device coupled to the vehicle may analyze the corrected radar imagery to identify the presence of an object. This detection may involve identifying a radar signature in the corrected radar imagery that corresponds to an object. The radar signature may be based on various factors, such as the RCS of the object, the distance of the object from the vehicle, the relative velocity of the object with respect to the vehicle, or the angle of arrival of the radar signal reflected by the object. By detecting the object in the corrected radar imagery, the computing device may provide a more accurate perception of the environment for the autonomous vehicle, potentially enhancing the safety and reliability of autonomous vehicle operation.

In some cases, a representation of the detected object may be displayed relative to the vehicle. This display may be provided on a display interface of the vehicle, such as a dashboard display, a head-up display, or a mobile device connected to the vehicle. The representation of the object may include various information about the object, such as the type of the object, the distance of the object from the vehicle, the relative velocity of the object with respect to the vehicle, or the direction of the object relative to the vehicle. The representation of the object may be updated in real-time based on the corrected radar imagery, providing the driver or the control system of the vehicle with up-to-date information about the environment of the vehicle. This display of the representation of the object relative to the vehicle may enhance the situational awareness of the driver or the control system, potentially improving the decision-making process for vehicle operations.

In some aspects, the weather estimation model may be received based on a geographic location or a route for the vehicle. For instance, the computing device coupled to the vehicle may receive the weather estimation model that is specific to a particular geographic location or a route that the vehicle is expected to traverse. This location or route-specific weather estimation model may provide more accurate weather estimation for the environment of the vehicle, as it may take into account the specific weather patterns or conditions associated with the geographic location or the route. In some cases, the geographic location may be determined based on a Global Positioning System (GPS) signal received by the vehicle. In other cases, the route for the vehicle may be determined based on a navigation system of the vehicle. The use of a geographic location or a route for receiving the weather estimation model may enhance the accuracy of weather estimation and, consequently, the correction of radar imagery.

In some aspects, the radar imagery may be used to estimate the size of rain droplets. This estimation may be based on the characteristics of the radar signal reflected by the rain droplets. For instance, larger rain droplets may reflect a stronger radar signal compared to smaller rain droplets. By analyzing the strength of the reflected radar signal, the computing device may infer the size of the rain droplets. This information may then be used to further refine the weather estimation model, as the size of the rain droplets can affect the level of radar beam attenuation. For example, larger rain droplets may cause greater attenuation of the radar beam compared to smaller rain droplets. By taking into account the estimated size of the rain droplets, the weather estimation model may provide a more accurate estimation of the weather-related attenuation effects on the radar imagery.

Figure 7:
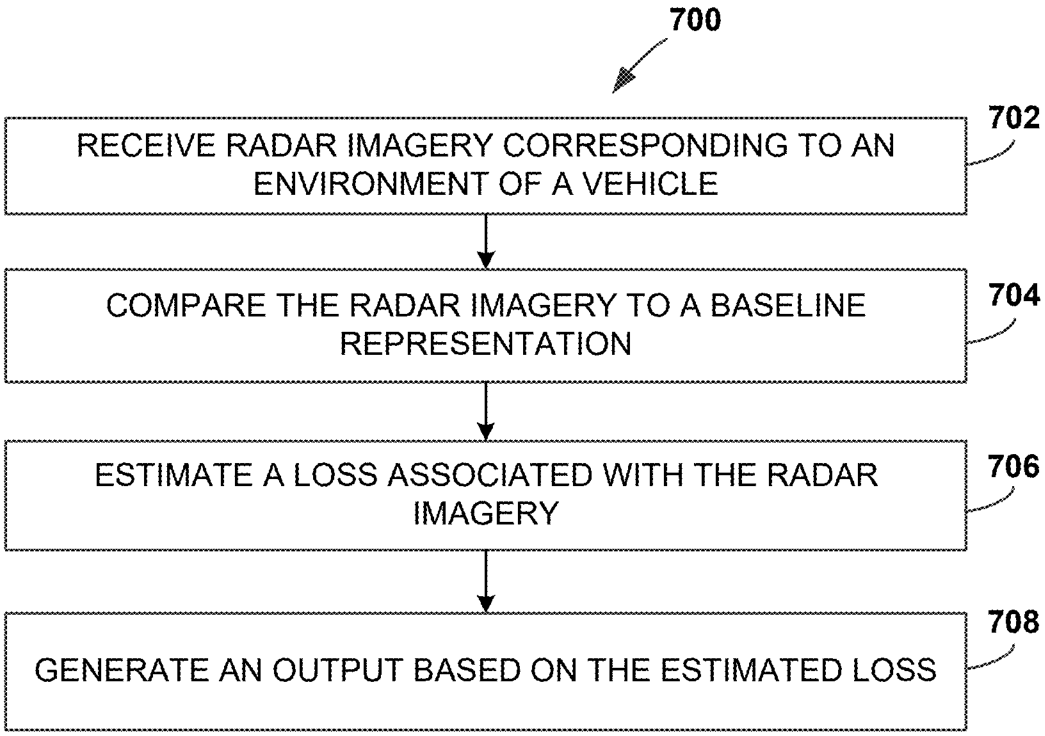
FIG. 7 is a flowchart of another method for mitigating the effects of weather-related attenuation on vehicle radar data, according to example embodiments.

FIG. 7 is a flow chart of method 700 for mitigating weather-related attenuation effects on radar imagery. Method 700 may include one or more operations, functions, or actions as illustrated by one or more of blocks 702, 704, 706, and 708. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 702, method 700 involves receiving radar imagery corresponding to an environment of a vehicle. Alternatively, the computing system may receive radar data in other formats and/or other types of sensor data in other examples.

At block 704, method 700 involves comparing the radar imagery to a baseline representation. For instance, the computing system may compare RCS values of the radar imagery to expected RCS values represented by a baseline model. The computing system may periodically or continuously compare the RCS values to the baseline model to infer when environment conditions have potentially degraded radar performance. The baseline model can have different formats within examples, such as a radar map that conveys expected RCS values for static objects at various locations. The baseline model may also convey expected RCS values for non-stationary objects, such as other vehicles, bicycles, and pedestrians, etc. When the comparison shows that the RCS values in newly generated radar data differs from the expected RCS values articulated by a baseline model, the computing system may proceed with estimating the loss caused by the environmental conditions.

At block 706, method 700 involves estimating a loss associated with the radar imagery. The computing system may use the comparison to infer the loss associated with the radar imagery. For instance, the estimated loss may be determined based on the difference between RCS values in radar data and corresponding RCS values for matching object types represented by the baseline model. The estimated loss may be compared to the estimated loss derived for other radars to evaluate individual radar performance. By comparing the losses determined for different radars during the same time period or periods, the computing system may further distinguish between aperture losses experienced by each radar individually and atmospheric losses impacting the radar system as a whole. Similarly, comparing results determined for multiple radars can also help identify situations where a particular radar is degraded to a greater extent than the other radars. For instance, debris may impact the performance of a radar, triggering the computing system to potentially provide an alert for servicing of the radar if the suboptimal performance of the radar continues during further testing and after cleaning efforts.

At block 708, method 700 involves generating an output based on the estimated loss. The output may be a signal for the control system to adjust the vehicle's speed to prevent outdriving current sensor coverage. The output may provide information that vehicle systems can use to adjust the vehicle control strategy, to modify the use or reliance on a particular sensor or sensor system, and/or perform other actions (e.g., provide an alert to a passenger or a remote computing device).

In some cases, the computing system may perform one or multiple corrective actions. The corrective actions may involve adjusting vehicle navigation strategy or performing other actions, such as informing vehicle systems to temporarily rely less (or not at all) on radar data until the computing system determines that weather conditions in the vehicle's environment have changed to more favorable conditions for capturing useful radar data. Similarly, the vehicle may reduce its speed or adjust other control parameters (e.g., braking distance) in response to determining that the environment conditions have degraded the maximum sensing range of the radar system or another sensor system. Reducing the vehicle's speed can help prevent the vehicle from driving beyond its current visibility.

In some cases, the output may indicate that a particular sensor within a sensor system is degraded. For instance, debris can cause one radar to underperform relative to other radars on the vehicle. As such, the computing system may avoid using the radar and/or provide an alert that the radar requires servicing. The computing system may check periodically if the quality of data from the radar improved before resuming use of the radar.

In some examples, radars are used with control electronics, which can include one or more field-programmable gate arrays (FPGAs), ASICs, CPUs, GPUs, and/or TPUs. For instance, a radar unit can generate and receive complex signals that require significant processing. One or more control electronics can be programmed to implement various signal processing algorithms, such as filtering, modulation/demodulation, noise reduction, and digital beamforming. These operations help extract relevant information from the received radar signals, enhance signal quality, and improve target detection and tracking. In addition, radar systems often involve the conversion of analog signals to digital format for further processing. The control electronics can include analog-to-digital converters (ADCs) and digital-to-analog converters (DACs) to facilitate these conversions. The control electronics can receive analog signals from radar sensors, digitize them, and process the digital data for analysis and interpretation.

In addition, the control electronics can also provide the capability for real-time control and coordination of various radar system components. For instance, the control electronics can handle synchronization, timing generation, and system control, ensuring the proper timing and sequencing of operations within the radar system. This real-time control is crucial for accurate and synchronized signal transmission and reception. The control electronics can efficiently handle large amounts of data generated by the radar system. The control electronics can implement data storage, buffering, and data flow management techniques, enabling efficient data handling during signal transmission. This includes tasks such as data compression, data packetization, and data routing, ensuring smooth and reliable data transmission within the radar system. The control electronics can also integrate various interfaces and protocols required for radar signal transmission, such as processors, memory modules, communication modules, and display units. The control electronics can provide the necessary interface logic to facilitate seamless data exchange between these components, enabling efficient data flow and system integration. The control electronics can also be reconfigured and customized to meet specific radar system requirements and adapt to changing operational needs. This allows radar system designers to implement and optimize algorithms and functionalities specific to their application, resulting in enhanced performance and efficiency.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

receiving, at a computing system coupled to a vehicle, radar imagery corresponding to an environment of the vehicle;

estimating, by the computing system using a weather estimation model, weather conditions for the environment;

determining, based on the estimated weather conditions for the environment, weather-related attenuation effects on the radar imagery by calculating a signal loss value associated with the radar imagery;

removing the weather-related attenuation effects to correct the radar imagery by comparing RCS values in the radar imagery to a baseline model representing RCS values for a plurality of objects during fair weather conditions, determining a difference between the RCS values in the radar imagery and the RCS values of the baseline model exceeds a threshold difference, and applying a signal offset based on the calculated signal loss value to the radar imagery; and providing the corrected radar imagery to a control system of the vehicle, wherein the control system comprises one or more processors configured to control the vehicle based on the corrected radar imagery.

2. The method of claim 1, wherein the weather estimation model comprises a processor executing a rain rate estimator algorithm, and wherein the processor executing the rain rate estimator algorithm is configured to map raw backscatter values in the radar imagery to a rain rate estimate for the environment of the vehicle.

3. The method of claim 2, wherein removing the weather-related attenuation to correct the radar imagery comprises:

mapping, using a weather loss model, the rain rate estimate to aperture and atmospheric losses in return signal strength corresponding to the radar imagery; and performing one or more corrective actions based on the aperture and atmospheric losses in return signal.

4. The method of claim 3, wherein performing the one or more corrective actions comprises:

providing a signal to the control system to reduce a speed of the vehicle.

5. The method of claim 3, wherein performing the one or more corrective actions comprises:

determining an offset based on the aperture and atmospheric losses in return signal strength corresponding to the radar imagery; and applying the offset to correct the radar imagery.

6. The method of claim 1, wherein estimating weather conditions for the environment comprises:

receiving sensor data from one or more non-radar sensors; and estimating the weather conditions for the environment based at least in part on the sensor data.

7. The method of claim 1, wherein the baseline model comprises a radar map representing radar imagery generated during fair weather conditions, and wherein comparing RCS values in the radar imagery to the baseline model representing RCS values for the plurality of objects during fair weather conditions comprises:

comparing RCS values in the radar imagery to RCS values for one or more objects specified by the radar map based on a location of the vehicle.

8. The method of claim 1, further comprising:

receiving a set of radar imagery representing the environment of the vehicle;

determining the environment of the vehicle has fair weather conditions; and modifying the baseline model based on the set of radar imagery.

9. The method of claim 1, further comprising:

receiving, from a remote computing system, the baseline model based on a location or route of the vehicle.

10. The method of claim 1, wherein the baseline model comprises an expected clutter versus noise profile having a clutter profile based on a median power of stationary pixels as a function of range and a noise profile being a median power of non-stationary pixels as a function of range.

11. The method of claim 1, further comprising:

detecting a decrease in a sensing range for a radar coupled to the vehicle; and providing an output to one or more vehicle systems conveying the detected decrease in the sensing range for the radar.

12. The method of claim 1, further comprising:

detecting an object using the corrected radar imagery; and displaying, on a display interface of the vehicle, a representation of the object relative to the vehicle.

13. A system comprising:

a vehicle radar system having a first radar and a second radar; and a computing device comprising one or more processors coupled to a vehicle, wherein the one or more processors are configured to:

receive radar imagery corresponding to an environment of the vehicle;

estimate, using a weather estimation model, weather conditions for the environment;

determine, based on the estimated weather conditions for the environment, weather-related attenuation effects on the radar imagery by calculating a signal loss value associated with the radar imagery, wherein determining the weather-related attenuation effects comprises:

determining first weather-related attenuation effects for first radar imagery received from the first radar and second weather-related attenuation effects for second radar imagery received from the second radar, and performing a comparison between the first weather-related attenuation effects for first radar imagery and the second weather-related attenuation effects for second radar imagery to differentiate between atmospheric loss and aperture loss;

remove the weather-related attenuation effects to correct the radar imagery by applying a signal offset based on the calculated signal loss value to the radar imagery; and provide the corrected radar imagery to a control system of the vehicle, wherein the control system comprises one or more processors configured to control the vehicle based on the corrected radar imagery.

14. The system of claim 13, wherein the one or more processors are further configured to:

use a neural network to remove the weather-related attenuation effects based on the estimated weather conditions for the environment.

15. The system of claim 13, wherein the one or more processors are further configured to:

degrade, using a weather loss model, radar imagery received during fair weather conditions.

16. The system of claim 13, wherein the one or more processors are further configured to:

detect, based on the weather-related attenuation effects, a decrease in a sensing range for a radar coupled to the vehicle; and providing an output to one or more vehicle systems conveying the detected decrease in the sensing range for the radar.

17. A non-transitory computer-readable medium configured to store instructions, that when executed by a computing system comprising one or more processors, causes the computing system to perform operations comprising:

receiving radar imagery corresponding to an environment of a vehicle;

estimating, by the computing system using a weather estimation model comprising a processor executing a rain rate estimator algorithm, weather conditions for the environment, wherein the processor executing the rain rate estimator algorithm is configured to map raw backscatter values in the radar imagery to a rain rate estimate for the environment of the vehicle;

determining, based on the estimated weather conditions for the environment, weather-related attenuation effects on the radar imagery by calculating a signal loss value associated with the radar imagery;

removing the weather-related attenuation effects to correct the radar imagery by mapping, using a weather loss model, the rain rate estimate to aperture and atmospheric losses in return signal strength corresponding to the radar imagery, and applying a signal offset based on the aperture and atmospheric losses to the radar imagery; and providing the corrected radar imagery to a control system of the vehicle, wherein the control system comprises one or more processors configured to control the vehicle based on the corrected radar imagery.

* * * * *